(12) United States Patent    (10) Patent No.: US 8,014,170 B2
Mori et al.    (45) Date of Patent: Sep. 6, 2011

(54) CABLE MANAGEMENT DEVICE AND METHOD OF CABLE MANAGEMENT

(75) Inventors: Kenneth Mori, Los Angeles, CA (US); Yoko Iida, Los Angeles, CA (US); Steven Lane, Orange, CA (US)

(73) Assignee: Belkin International, Inc., Playa Vista, CA (US)

( * ) Notice: Subject to any disclaimer, the term of this patent is extended or adjusted under 35 U.S.C. 154(b) by 1064 days.

(21) Appl. No.: 11/588,964

(22) Filed: Oct. 27, 2006

(65) Prior Publication Data

US 2007/0039755 A1    Feb. 22, 2007

Related U.S. Application Data

(63) Continuation-in-part of application No. 10/649,997, filed on Aug. 26, 2003, now Pat. No. 7,167,372.

(51) Int. Cl.
*H02B 1/20* (2006.01)
(52) U.S. Cl. ............... 361/826; 174/53; 174/58
(58) Field of Classification Search .......... 361/731, 361/826; 439/51, 4
See application file for complete search history.

(56) References Cited

U.S. PATENT DOCUMENTS

| | | | |
|---|---|---|---|
| 355,491 A * | 1/1887 | Wiley | 248/61 |
| 3,990,763 A | 11/1976 | Kress | |
| 4,119,359 A | 10/1978 | Schultz | |
| 4,401,351 A | 8/1983 | Record | |
| 4,501,460 A | 2/1985 | Sisler | |
| 4,558,914 A | 12/1985 | Prager et al. | |
| 4,688,864 A | 8/1987 | Sorel | |
| D301,713 S | 6/1989 | Bolan et al. | |
| 4,845,589 A | 7/1989 | Weidler et al. | |
| 4,850,485 A | 7/1989 | Ishikawa | |
| D313,340 S | 1/1991 | Stathis et al. | |
| 5,030,128 A | 7/1991 | Herron et al. | |
| 5,071,367 A | 12/1991 | Luu | |
| 5,247,406 A | 9/1993 | Apple et al. | |
| 5,333,097 A | 7/1994 | Christensen et al. | |
| 5,336,102 A | 8/1994 | Cairns et al. | |
| D350,940 S | 9/1994 | Rossman et al. | |
| D350,944 S | 9/1994 | Shewmon et al. | |
| 5,358,420 A | 10/1994 | Cairns et al. | |
| D354,903 S | 1/1995 | Mockett | |

(Continued)

FOREIGN PATENT DOCUMENTS

DE    2 515 688    4/1976

(Continued)

OTHER PUBLICATIONS

European Patent Office Examination Report; Application No. 07254235.0-1242; Jul. 20, 2009; 3 pages.

(Continued)

*Primary Examiner* — Jeremy C. Norris
*Assistant Examiner* — Abiy Getachew
(74) *Attorney, Agent, or Firm* — Bryan Cave LLP

(57) ABSTRACT

An electrical device (800, 1100, 1700, 1800) includes: a housing (810, 1110) having a top portion (811, 1111); a bottom portion (816, 1316) opposite the top portion; and a first side portion (917, 1217) between the top portion and the bottom portion; and a first cable management element (850) located at the first side portion, and having a first flexible tube (851) with a first opening (852) along a length of the first flexible tube.

31 Claims, 17 Drawing Sheets

U.S. PATENT DOCUMENTS

| | | | |
|---|---|---|---|
| 5,381,315 A | 1/1995 | Hamaguchi et al. | |
| D355,416 S | 2/1995 | McCay et al. | |
| D358,980 S | 6/1995 | Mockett | |
| 5,440,181 A | 8/1995 | Gruender, Jr. et al. | |
| D362,663 S | 9/1995 | Nguyen | |
| D365,333 S | 12/1995 | Mihalik et al. | |
| D366,455 S | 1/1996 | Cheng | |
| 5,483,419 A | 1/1996 | Kaczeus, Sr. et al. | |
| 5,498,174 A | 3/1996 | Speer et al. | |
| 5,515,239 A | 5/1996 | Kamerman et al. | |
| D375,909 S | 11/1996 | Dziersk et al. | |
| 5,586,002 A | 12/1996 | Notarianni | |
| 5,591,048 A | 1/1997 | Hahn | |
| 5,604,662 A | 2/1997 | Anderson et al. | |
| 5,621,890 A | 4/1997 | Notarianni et al. | |
| D379,972 S | 6/1997 | Mihalik et al. | |
| 5,645,434 A | 7/1997 | Leung | |
| 5,673,172 A | 9/1997 | Hastings et al. | |
| 5,692,400 A | 12/1997 | Bliven et al. | |
| 5,700,159 A | 12/1997 | Albeck | |
| 5,706,179 A | 1/1998 | Palatov | |
| D391,944 S | 3/1998 | Han | |
| D392,147 S | 3/1998 | Gervais et al. | |
| 5,726,922 A | 3/1998 | Womble et al. | |
| D393,451 S | 4/1998 | Faranda et al. | |
| 5,737,189 A | 4/1998 | Kammersgard et al. | |
| 5,772,456 A | 6/1998 | Ohishi | |
| 5,777,845 A | 7/1998 | Krum et al. | |
| RE35,915 E | 10/1998 | Hastings et al. | |
| 5,822,184 A | 10/1998 | Rabinovitz | |
| 5,825,618 A | 10/1998 | Schnoor et al. | |
| 5,835,353 A | 11/1998 | Dalby | |
| 5,871,368 A | 2/1999 | Erdner et al. | |
| 5,875,094 A | 2/1999 | Kirkendoll | |
| D408,012 S | 4/1999 | Brownlie | |
| 5,896,273 A | 4/1999 | Varghese et al. | |
| D411,989 S | 7/1999 | Grossman et al. | |
| D412,322 S | 7/1999 | Wu | |
| D412,494 S | 8/1999 | Tamaki et al. | |
| 5,938,473 A | 8/1999 | Nishio et al. | |
| 5,940,319 A | 8/1999 | Durlam et al. | |
| D413,893 S | 9/1999 | Luzbetak et al. | |
| 5,956,267 A | 9/1999 | Hurst et al. | |
| D415,741 S | 10/1999 | Lee et al. | |
| D416,007 S | 11/1999 | Cavello | |
| D416,559 S | 11/1999 | Hoyt et al. | |
| 6,018,456 A | 1/2000 | Young et al. | |
| D419,978 S | 2/2000 | Mah | |
| 6,024,599 A | 2/2000 | Stathis et al. | |
| D421,962 S | 3/2000 | Varga | |
| D422,267 S | 4/2000 | Richards | |
| D423,010 S | 4/2000 | Wicks | |
| 6,047,572 A | 4/2000 | Bliven et al. | |
| 6,050,849 A | 4/2000 | Chang | |
| 6,052,278 A | 4/2000 | Tanzer et al. | |
| 6,052,472 A | 4/2000 | Lo | |
| D425,866 S | 5/2000 | Nagasawa et al. | |
| 6,073,188 A | 6/2000 | Fleming | |
| 6,076,142 A | 6/2000 | Corrington et al. | |
| 6,085,925 A | 7/2000 | Chung | |
| 6,098,131 A | 8/2000 | Unger et al. | |
| 6,108,198 A | 8/2000 | Lin | |
| 6,141,221 A | 10/2000 | Tong et al. | |
| 6,147,859 A | 11/2000 | Abboud | |
| 6,153,443 A | 11/2000 | Durlam et al. | |
| D435,558 S | 12/2000 | Tong et al. | |
| D436,109 S | 1/2001 | Tong et al. | |
| 6,174,737 B1 | 1/2001 | Durlam et al. | |
| 6,179,665 B1 | 1/2001 | Rossman et al. | |
| D439,109 S | 3/2001 | Pai | |
| 6,211,090 B1 | 4/2001 | Durlam et al. | |
| D444,462 S | 7/2001 | Tsuji | |
| 6,254,427 B1 | 7/2001 | Stathis | |
| D450,686 S | 11/2001 | Beaumont et al. | |
| 6,315,582 B1 | 11/2001 | Nishio et al. | |
| 6,331,938 B1 | 12/2001 | Hsieh et al. | |
| 6,349,036 B1 | 2/2002 | Chang et al. | |
| D458,608 S | 6/2002 | Tong et al. | |
| 6,430,084 B1 | 8/2002 | Rizzo et al. | |
| 6,430,085 B1 | 8/2002 | Rizzo | |
| D462,689 S | 9/2002 | Moran | |
| 6,466,434 B1 | 10/2002 | Tsai | |
| D465,223 S | 11/2002 | Milan | |
| D475,996 S | 6/2003 | Skulley | |
| 6,607,408 B2 | 8/2003 | Milan | |
| 6,609,928 B1 | 8/2003 | Le | |
| 6,650,549 B1 | 11/2003 | Chiao | |
| 6,669,513 B2 | 12/2003 | Huang | |
| 6,697,892 B1 | 2/2004 | Laity et al. | |
| 6,716,047 B2 | 4/2004 | Milan | |
| 6,720,597 B2 | 4/2004 | Janesky et al. | |
| 6,722,917 B2 | 4/2004 | Huang | |
| D500,497 S | 1/2005 | Yu et al. | |
| 6,905,374 B2 | 6/2005 | Milan | |
| D510,091 S | 9/2005 | Mori et al. | |
| 6,942,173 B1 * | 9/2005 | Abramov | 242/400.1 |
| D512,718 S | 12/2005 | Mori et al. | |
| 6,983,341 B1 | 1/2006 | Lim et al. | |
| D516,074 S | 2/2006 | Ho et al. | |
| D520,012 S | 5/2006 | Nishio et al. | |
| D524,310 S | 7/2006 | Kent et al. | |
| D530,717 S | 10/2006 | Mori et al. | |
| D537,056 S | 2/2007 | Endo et al. | |
| D559,849 S | 1/2008 | Siu | |
| D561,762 S | 2/2008 | Mori | |
| 7,329,152 B2 | 2/2008 | Mori et al. | |
| D576,166 S | 9/2008 | Mori et al. | |
| D582,345 S | 12/2008 | Ham et al. | |
| 2003/0148656 A1 | 8/2003 | Huang | |
| 2003/0225954 A1 | 12/2003 | Wu | |
| 2004/0234254 A1 | 11/2004 | Czupich et al. | |
| 2005/0047099 A1 | 3/2005 | Mori et al. | |
| 2005/0094355 A1 | 5/2005 | Mori et al. | |
| 2005/0282417 A1 | 12/2005 | Tsao | |

FOREIGN PATENT DOCUMENTS

| | | |
|---|---|---|
| GB | 2 347 795 | 9/2000 |
| GB | 2350031 | 11/2000 |
| JP | 2000-120968 | 4/2000 |
| JP | 2000-163168 | 6/2000 |
| JP | 2000-171141 | 6/2000 |
| JP | 2000-311168 | 6/2000 |
| JP | 2000-231969 | 8/2000 |
| JP | 2001-102136 | 4/2001 |
| JP | 2003-021041 | 1/2003 |

OTHER PUBLICATIONS

China (Mainland) USB Hub 2.0 Feb. 3, 2006 JCE-364 222.alibaba.com.

Value USB 2.0 Dome Hub 4 Port Feb. 3, 2006 www.mercateo.com.

Kensington USB 2.0 Dome Hub Feb. 3, 2006 33118 www.target.com.

Internet: Belkin Catalog; USB 7-Port Hub; Aug. 25, 2003 [http://catalog.belkin.com/IWCatProductPage.process?Merchant_Id=1&Product_Id=121417].

Internet: Netgear; Model FS605 5-Port Fast Ethernet Switch; Aug. 25, 2003; [http://www.netgear.com/products/prod_details.asp?prodID=130&view=].

Internet: Netgear; Model FS608 8 Port 10/100 Switch; Aug. 25, 2003; [http://www.netgear.com/products/prod_details.asp?prodID=132&view=].

Internet: Netgear; Model CG814M Wireless Cable Modem Gateway; Aug. 25, 2003; [http://www.netgear.com/products/prod_details.asp?prodID=160&view=].

Internet: Netgear; Model WGR614 Cable/DSL Wireless Router 54 Mbps/2.4 GHz; Aug. 25, 2003; [http://www.netgear.com/products/prod_details.asp?prodID=174&view=].

Internet: Netgear; Model MR814 802.11b Cable DSL Wireless Router; Aug. 25, 2003; [http://www.netgear.com/products/prod_details.asp?prodID=151&view=].

Internet: Netgear; Model WGT624 108 Mbps Wireless Firewall Router; [http://www.netgear.com/products/prod—details.asp?prodID=214&view=].

Internet: Netgear; Model WG602 54 Mbps Wireless Access Point; Aug. 25, 2003; [http://www.netgear.com/products/prod_details.asp?prodID=170&view=].

Internet: Netgear; Model ME101 Wireless Ethernet Bridge; Aug. 25, 2003; [http://www.netgear.com/products/prod_details.asp?prodID=175&view=].

Internet: Netgear; Model WGT624 108 Mbps Wireless Firewall Router; Aug. 25, 2003; [http://www.netgear.com/products/prod_details.asp?prodID=214&view=].

Internet: Netgear; Model CG814M Wireless Cable Modem Gateway; Aug. 25, 2003; [http://www.netgear.com/products/prod_details.asp?prodID=160&view=].

Internet: Netgear; Model MR814 802.11b Cable/DSL Wireless Router; Aug. 25, 2003; [http://www.netgear.com/products/prod_details.asp?prodID=151&view=].

Internet: Netgear; Model DG824M Wireless ADSL Modem Gateway with 4-port 10/100 Mbps Switch; Aug. 25, 2003; [http://www.netgear.com/products/prod_details.asp?prodID=165&view=].

Internet: Netgear; Model RP614 4-Port Cable/DSL Router with 10/100 Mbps Switch; Aug. 25, 2003; [http://www.netgear.com/products/prod_details.asp?prodID=131&view=].

Internet: Netgear; Model DG814 DSL Modem Internet Gateway; Aug. 25, 2003; [http://www.netgear.com/products/prod_details.asp?prodID=136&view=].

Internet: Netgear; Model CM212 Broadband Cable Modem; Aug. 25, 2003; [http://www.netgear.com/products/prod_details.asp?prodID=164&view=].

Internet: Netgear; Model DG824M Wireless ADSL Modem Gateway with 4-port 10/100 Mbps Switch; [http://www.netgear.com/products/prod_details.asp?prodID=165&view=].

Internet: Netgear; Model DM602 ADSL Modem; Aug. 25, 2003; [http://www.netgear.com/products/prod_details.asp?prodID=171&view=].

Fellowes Swivel Hub hub—4 ports—desktop. http://www.ciao.co.uk/Productinformation/Fellowes_Hub_6228583; retrieved Feb. 8, 2011; 2 pgs.

Fellowes Unveils USB 2.0 Product Line. http://www.twice.com/article/233763-Fellowes_Unveils_USB_2_0_Product_Line.php; retrieved Feb. 8, 2011; 2 pgs.

Fellowes 99462 USB 2.0 Swivel Hub (4-port). http://www.amazon.com/Fellowes-99462-USB-Swivel-4-port/dp/B00006B8K4/; retrieved Feb. 9, 2011; 5 pgs.

\* cited by examiner

2000

2010 — Provide an electrical device comprising: a housing with a first side; and a first cable management element located at the first side and comprising: a first flexible tube with a first aperture extending a length of the first flexible tube

2020 — Provide one or more cables, each of the one or more cables comprising: a wire portion with a first end and a second end; a first connector coupled to the wire portion at the first end; and a second connector coupled to the wire portion at the second end

2030 — Insert the wire portions of the one or more cables into the first flexible tube through the first aperture

2040 — Couple the first connectors of the one or more cables to the electrical device or to one or more foreign electrical components

2050 — Couple the second connectors of the one or more cables to one or more second foreign electrical components

*FIG. 20*

CABLE MANAGEMENT DEVICE AND METHOD OF CABLE MANAGEMENT

CROSS-REFERENCE TO RELATED APPLICATION

This application is a continuation-in-part of U.S. patent application Ser. No. 10/649,997, filed Aug. 26, 2003.

FIELD OF THE INVENTION

This invention relates to cable management, in general, and to electrical devices incorporating cable management elements, in particular.

BACKGROUND OF THE INVENTION

Modern desktops or workspaces contain multiple electrical devices such as computers, printers, fax machines, monitors, telephones, personal digital assistances, hubs, power supplies, cellular telephones, digital music players, clocks, memory devices, compact disk player, etc. Multiple electrical cables can protrude from each of these devices with some devices, like computers, possibly having five or more cables alone. Traditionally, these cables are left unorganized to clutter the desktop or workspace. This cable clutter can create hazards to personnel and equipment. For example, a person's arm or leg can snag a stray cable, and pull the electrical device, attached to the cable, off of a desk. The electrical device falling off the desk could possibly damage the electrical device or injure someone.

Existing cable management schemes for the desktop includes bundling electrical cables together. For example, cables can be bundled using zip ties or clips. However, this cable management method makes it difficult to remove cables from the bundle. For example, a zip tie has to be cut and replaced with a new zip tie every time a user wants to remove one cable from the bundle.

Accordingly, a need exists for an electrical device with cable management elements to help manage cable clutter on the desktop and to create a more organized workspace.

BRIEF DESCRIPTION OF THE DRAWINGS

The invention will be better understood from a reading of the following detailed description, taken in conjunction with the accompanying figures in the drawings in which:

FIG. 20 is a flow chart illustrating a method of cable management according to an embodiment.

Figure 1:
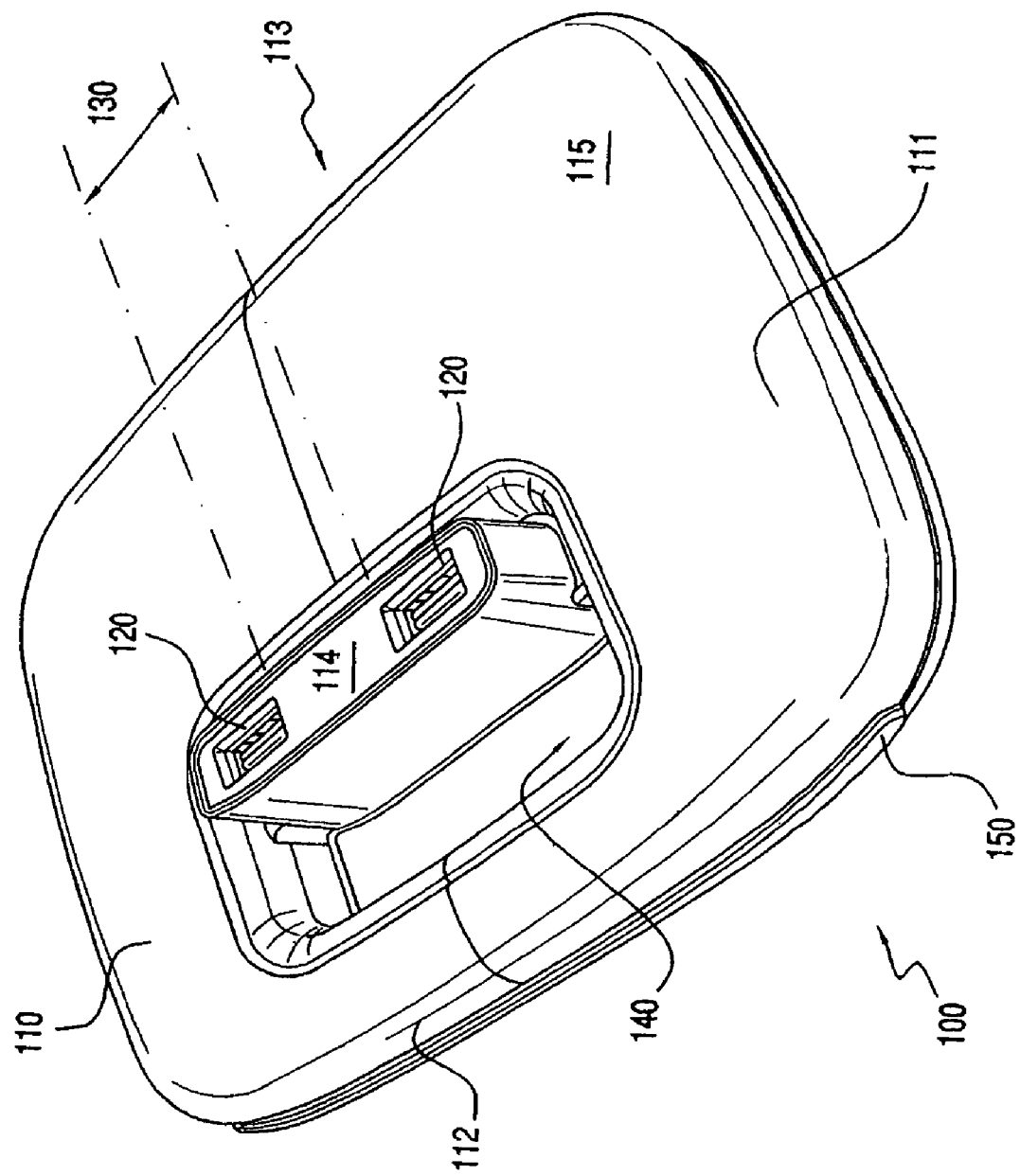
FIG. 1 is an isometric view of a universal serial bus hub according to an embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment, a universal serial bus hub includes: (1) a housing having a top portion, (2) a bottom portion opposite the top portion, (3) a first side between the top portion and the bottom portion, and (4) a second side between the top portion and the bottom portion. The universal serial bus hub further comprises a first universal serial bus port at the top portion and a second universal serial bus port at the second side.

In a further embodiment, an electrical device includes: (1) a housing having (a) a top portion, (b) a bottom portion opposite the top portion, and (c) a first side portion between the top portion and the bottom portion, and (2) a first cable management element located at the first side portion, and having a first flexible tube with a first opening along a length of the first flexible tube.

In yet another embodiment, a method of cable management includes: (1) providing an electrical device having: (a) a housing with a first side, and (b) a first cable management element located at the first side and including a first flexible tube with a first aperture extending a length of the first flexible tube, (2) providing one or more cables, each of the one or more cables having: (a) a wire portion with a first end and a second end, (b) a first connector coupled to the wire portion at the first end, and (c) a second connector coupled to the wire portion at the second end; and (3) inserting the wire portions of the one or more cables into the first flexible tube through the first aperture.

As it is used herein, the word "side," "surface," or "portion" can mean a region or area along the perimeter of a rectangle, square, or other shape with straight sides, and can also mean a region or area along the perimeter of an oval, a circle, or other shape with curved or non-straight sides.

Figure 2:
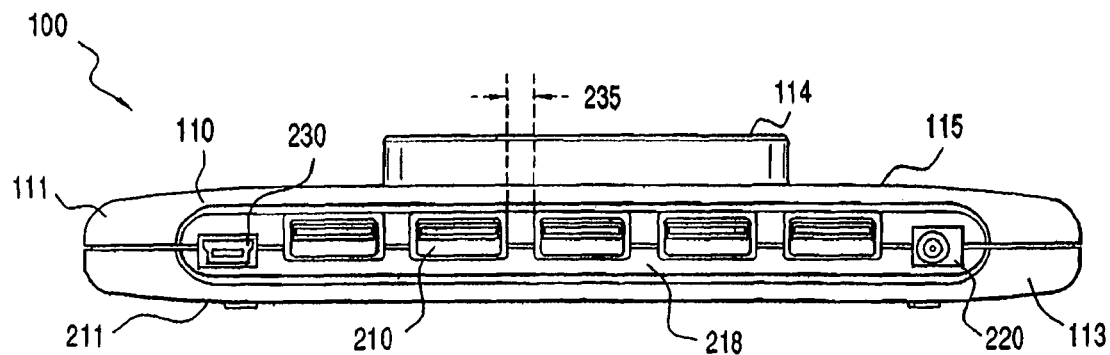
FIG. 2 is a side elevational view of the universal serial bus hub of FIG. 1 according to an embodiment of the invention.

FIG. 1 is an isometric view of a universal serial bus hub 100 according to an embodiment. FIG. 2 is an elevational view of a side 113 of universal serial bus hub 100 according to an embodiment. Referring to FIGS. 1 and 2, universal serial bus hub 100 comprises a housing 110, at least one universal serial bus port 120, and at least one universal serial bus port 210. Housing 110 comprises a top portion 111, a bottom portion 211 opposite top portion 111, a side 112 between top portion 111 and bottom portion 211, and side 113 between top portion 111 and bottom portion 211. Side 112 comprises a portion 150, which can comprise a translucent material. In one embodiment, side 112 is located opposite side 113. Universal serial bus port 120 is at top portion 111, and universal serial bus port 210 is at side 113.

Universal serial bus hub 100 can further comprise a power port 220 at side 113. In one embodiment, universal serial bus hub 100 further comprises a universal serial bus port 230 at side 113. In one embodiment, universal serial bus port 210, universal serial bus port 230, and power port 220 are located in a recess 218. At least a portion of housing 110 can be coated with a rubberized material.

In one embodiment, universal serial bus ports 120 and 210 comprise downstream universal serial bus ports, meaning universal serial bus ports 120 and 210 are configured to receive a universal serial bus connection from a peripheral device such as a printer, a scanner, a light, a fan, or the like. In the same or another embodiment, universal serial bus port 210 is one of a group of downstream universal serial bus ports. In one embodiment, the group of downstream universal serial bus ports consists of five downstream universal serial bus ports. In the same or another embodiment, universal serial bus port 120 is one of a group of downstream universal serial bus ports 120 located at region 114. In a particular embodiment, the group of downstream universal serial bus ports consists of two downstream universal serial bus ports at region 114. In the same or another embodiment, universal serial bus port 230 can comprise an upstream universal serial bus port, meaning universal serial bus port 230 is configured to receive one end of a universal serial bus cable, the other end of which is attached to a computer. As an example, universal serial bus port 230 can be a mini B universal serial bus port.

In one embodiment, universal serial bus port 210 is oriented with its longer axis substantially parallel to top portion 111 and bottom portion 211 so as to reduce a height of universal serial bus hub 100, as illustrated in FIG. 2. In another embodiment, universal serial bus port 210 can be oriented with its long axis substantially perpendicular to top portion 111 and bottom portion 211 so as to decrease a width of universal serial bus hub 100.

Universal serial bus ports 120 are spaced apart by a distance 130. As an example, distance 130 can be such that multiple non-corded universal serial bus devices can be simultaneously inserted into universal serial bus ports 120 without interference among the housings of such devices. In one embodiment, distance 130 is larger than a distance 235 between adjacent ones of universal serial bus ports 210.

In one embodiment, top portion 111 comprises a region 114 and a region 115, where region 114 is higher than region 115. In that embodiment, universal serial bus port 120 is at region 114. As an example, region 114 can be an extension that rises above region 115, as illustrated in FIG. 1. As another example, region 114 can be integral with top portion 111 of housing 110. As a different example, region 114 can be separate from top portion 111, and can be integrated with housing 110 as a separate piece.

Locating universal serial bus port 120 at region 114 offers several advantages. For example, a user of universal serial bus hub 100 can insert a universal serial bus cable into universal serial bus port 120 with one hand without the need to secure universal serial bus hub 100 in place with the other hand. Instead, universal serial bus hub 100 tends to stay in place because the downward force created by pushing the universal serial bus cable or device into universal serial bus port 120 is counterbalanced by an equal and opposite force pushing upward on universal serial bus hub 100 from the desk or other surface on which universal serial bus hub 100 is placed. As another example, universal serial bus port 120 is easily accessible by virtue of its raised position above region 115.

In one embodiment, a hole 140 is located between side 112 and side 113 and extends from top portion 111 to bottom portion 211 of universal serial bus hub 100. Hole 140 can also be adjacent to regions 114 and 115.

Figure 3:
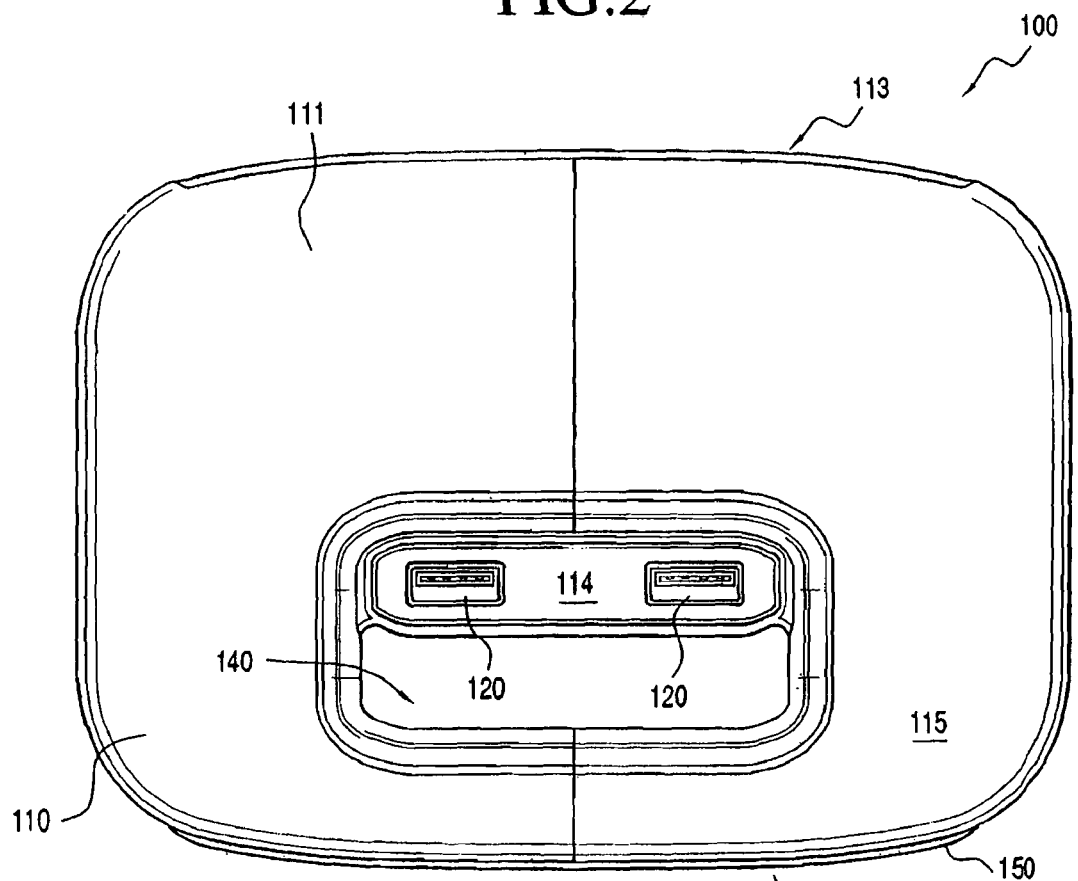
FIG. 3 is a top view of the universal serial bus hub of FIG. 1 according to an embodiment.
Figure 4:
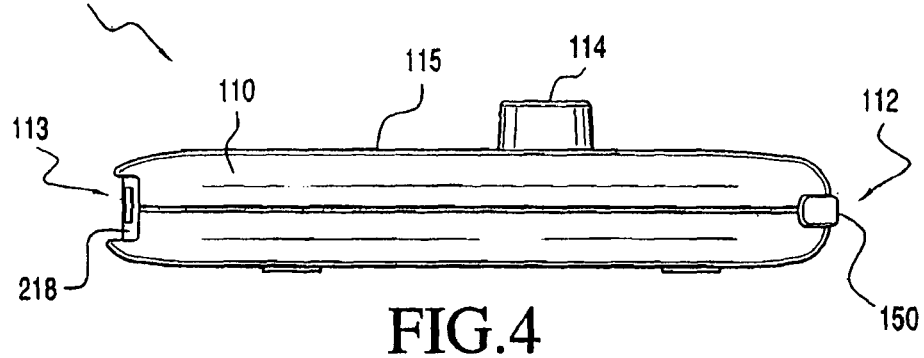
FIG. 4 is a different side elevational view of the universal serial bus hub of FIG. 1 according to an embodiment.
Figure 5:
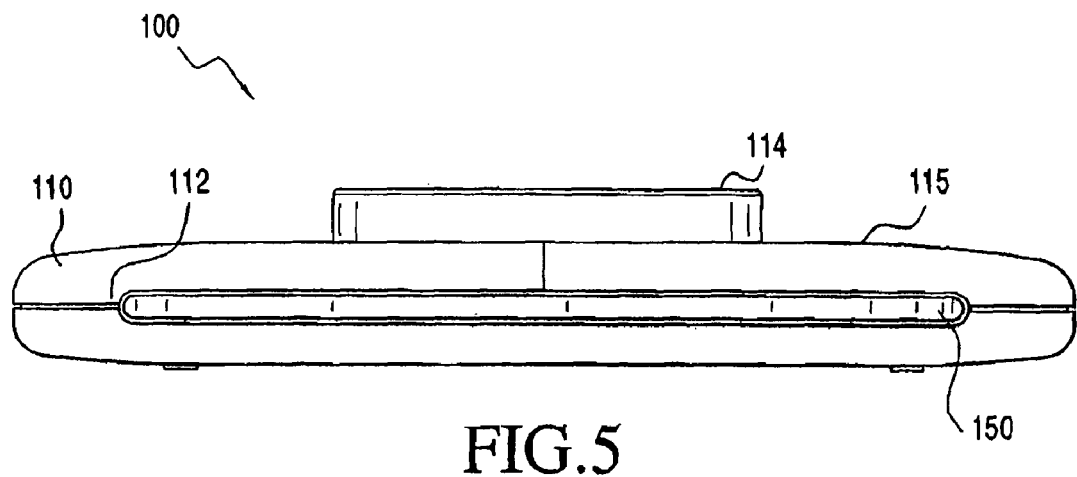
FIG. 5 is a still different side elevational view of the universal serial bus hub of FIG. 1 according to an embodiment.
Figure 6:
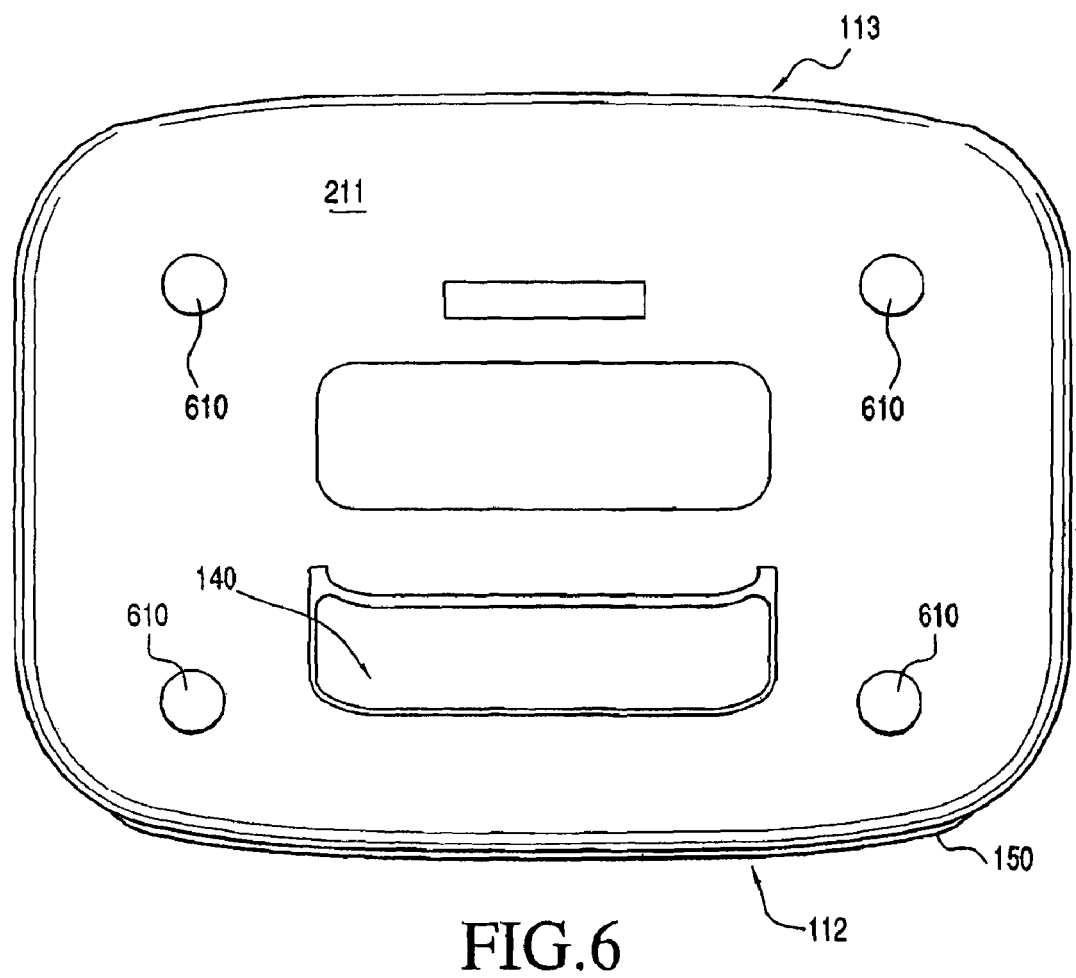
FIG. 6 is a bottom view of the universal serial bus hub of FIG. 1 according to an embodiment.

FIGS. 3-6 show universal serial bus hub 100 from additional perspectives beyond those shown in FIGS. 1 and 2. FIG. 3 is a top view of universal serial bus hub 100 according to an embodiment. FIG. 4 is a side elevational view of universal serial bus hub 100 according to an embodiment. FIG. 5 is a different side elevational view of universal serial bus hub 100 according to an embodiment. FIG. 6 is a bottom view of universal serial bus hub 100 according to an embodiment. FIGS. 4 and 5 show different sides of universal serial bus hub 100 than does FIG. 2. The side of universal serial bus hub 100 substantially opposite the side illustrated in FIG. 4 is, in one embodiment, substantially similar to the side illustrated in FIG. 4. As illustrated in FIG. 6, universal serial bus hub 100 further comprises feet 610 at bottom portion 211. As an example, when universal serial bus hub 100 is placed on a work surface, feet 610 can support housing 110 above the work surface.

Figure 7:
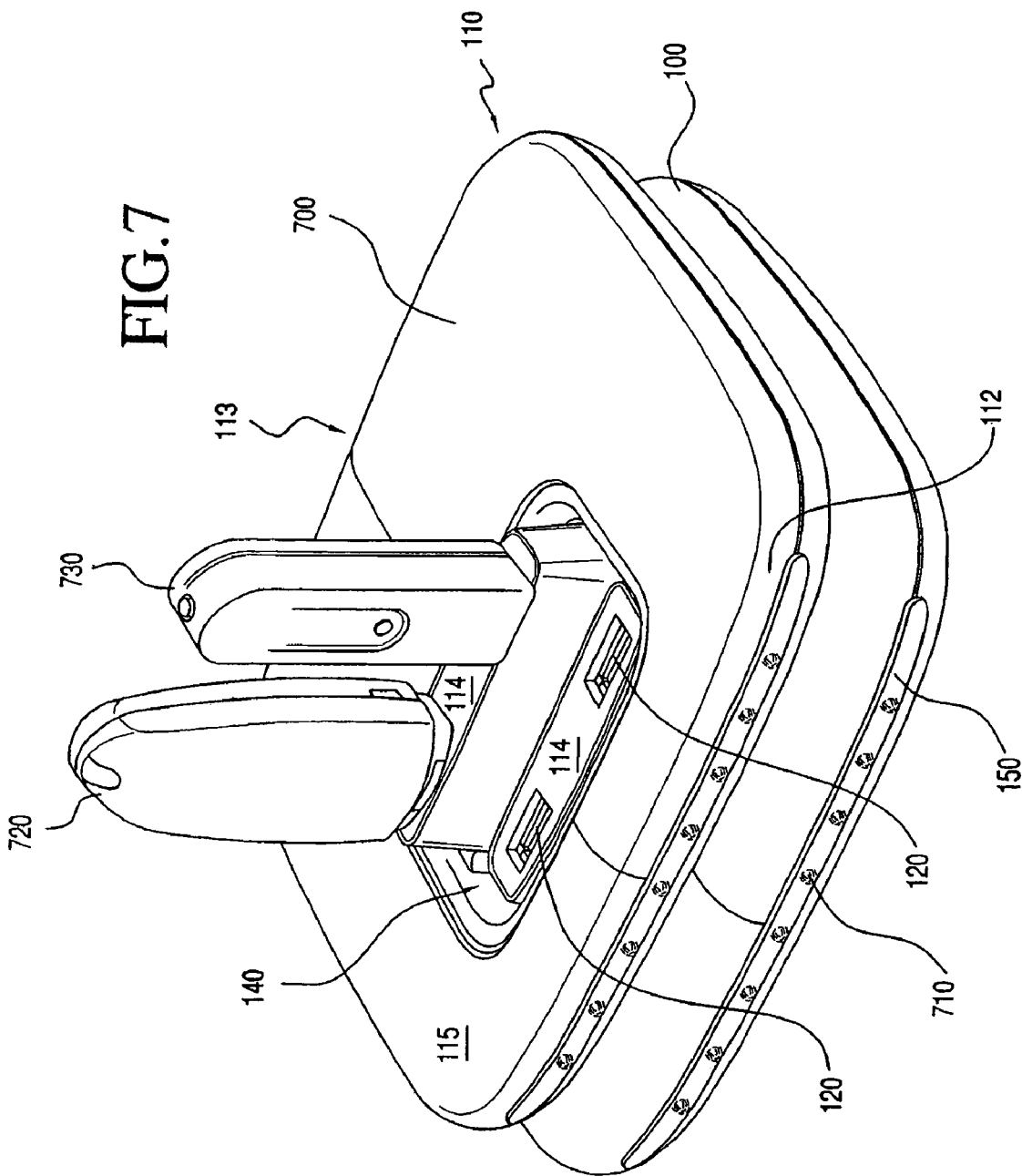
FIG. 7 is an isometric view of two universal serial bus hubs in a stacked configuration according to an embodiment.

Universal serial bus hub 100 is stackable with a universal serial bus hub 700, as illustrated in FIG. 7, which is an isometric view of two universal serial bus hubs in a stacked configuration according to an embodiment. Universal serial bus hub 700 is identical, or at least substantially similar to universal serial bus hub 100, and each of the reference numerals used herein to identify elements of universal serial bus hub 100 should be understood to also refer to corresponding elements of universal serial bus hub 700. FIG. 7 illustrates a peripheral device 720 and a peripheral device 730 plugged into each of two universal serial bus ports 120 located at region 114 of universal serial bus hub 700.

Referring to FIG. 7, it may be seen that region 114 of universal serial bus hub 100 extends into hole 140 of universal serial bus hub 700 when universal serial bus hub 700 is stacked on top of universal serial bus hub 100. As further illustrated in FIG. 7, universal serial bus port 120 of universal serial bus hub 100 is accessible through hole 140 of universal serial bus hub 700 when universal serial bus hub 700 is stacked on top of universal serial bus hub 100. Because of the manner in which region 114 of universal serial bus hub 100 extends into hole 140 of universal serial bus hub 700, universal serial bus hubs 100 and 700 are self-aligned when universal serial bus hub 100 is stacked with universal serial bus hub 700. Universal serial bus hubs 100 and 700 can also be stacked such that universal serial bus hub 100 is stacked on top of universal serial bus hub 700 and where region 114 of universal serial bus hub 700 extends into hole 140 of universal serial bus hub 100. In one embodiment, region 114 of universal serial bus hub 100 or 700 extends partially into hole 140 of the other one of universal serial bus hub 100 or 700, but does not extend all the way through hole 140 of the other one of universal serial bus hub 100 or 700, as illustrated in FIG. 7.

Referring still to FIG. 7, universal serial bus hub 100 further comprises a status indicator 710 at side 112. Status indicator 710 indicates a status of at least one of power port 220, universal serial bus port 120, universal serial bus port 210, or universal serial bus port 230. As an example, status indicator 710 can light up to indicate that adequate power is being provided to universal serial bus hub 100, that one or more of power port 220, universal serial bus port 120, universal serial bus port 210, or universal serial bus port 230 are functioning properly, or the like. As a further example, status indicator 710 can be a light emitting diode. In one embodiment, status indicator 710 is visible through portion 150 of side 112, for example, through the translucent material of portion 150. In the same or another embodiment, status indicator 710 is one of a group of status indicators.

Figure 8:
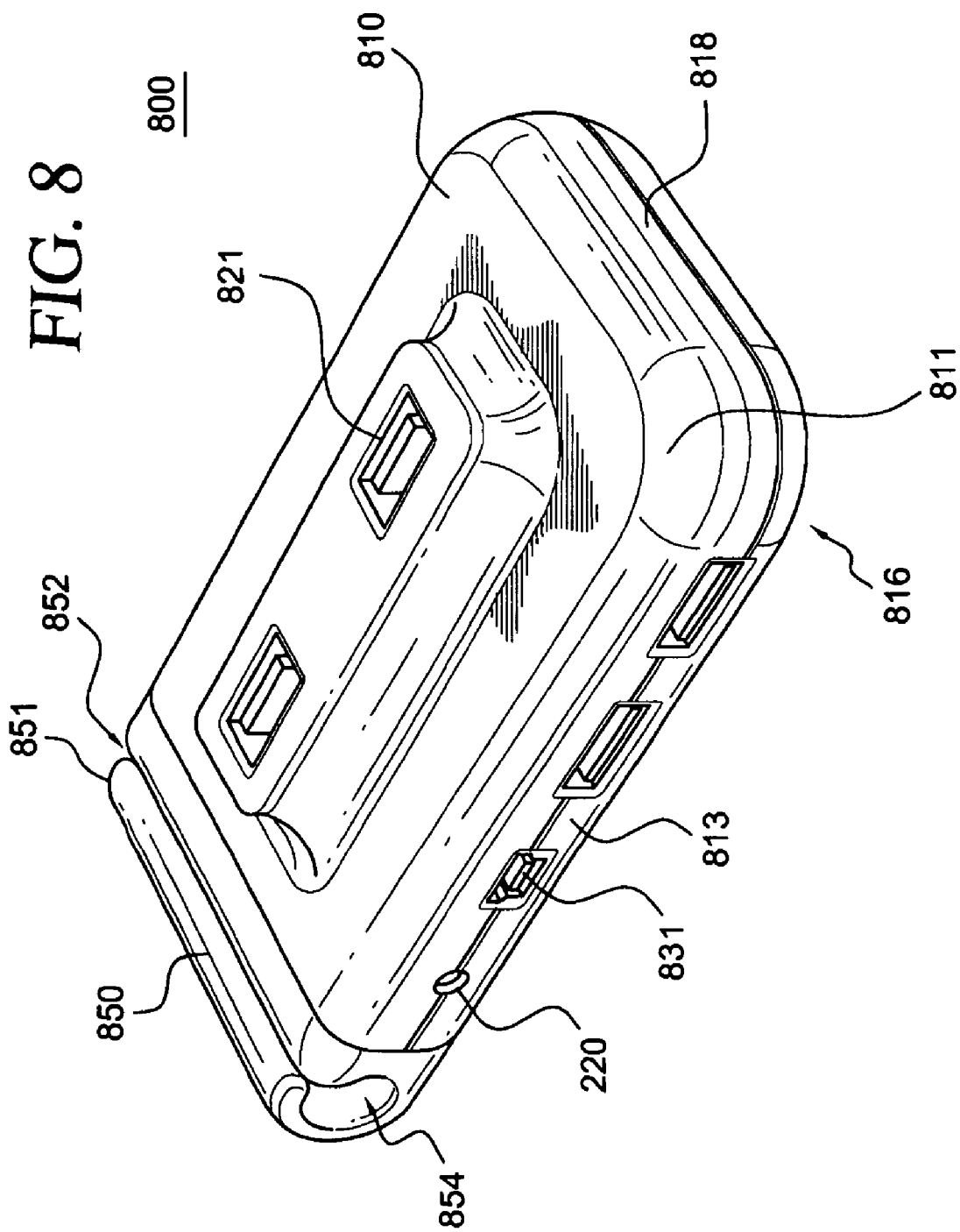
FIG. 8 illustrates an isometric view of an electrical device according to a further embodiment.
Figure 9:
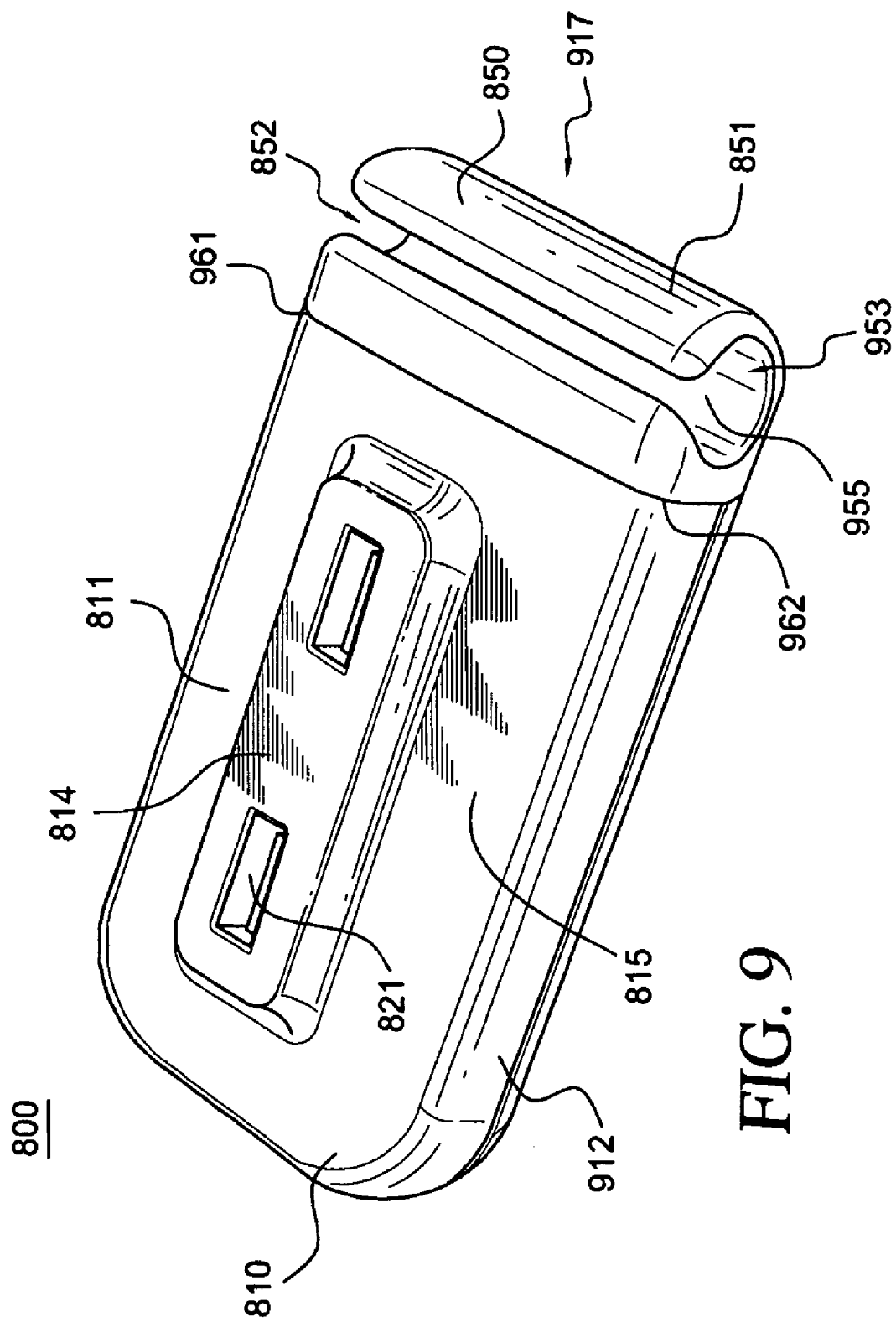
FIG. 9 illustrates an additional isometric view of the electrical device of FIG. 8 according to an embodiment.

FIG. 8 illustrates an isometric view of an electrical device 800 according to a further embodiment. FIG. 9 illustrates an additional isometric view of device 800 according to an embodiment. It should be understood that device 800 is merely exemplary and is not limited to the embodiments presented herein. The functional aspects and/or structures of device 800 can be employed in many different devices or apparatuses not specifically depicted herein.

As an example, device 800 can include a casing or housing 810, electrical connectors 821 and 831, and a cable management element 850. In one embodiment, housing 810 includes a top portion 811, a bottom portion 816 opposite top portion 811, a side portion 917 between top portion 811 and bottom portion 816, a side portion 818 between top portion 811 and bottom portion 816, side portions 813 and 912 between top portion 811 and bottom portion 816 and also between side portions 818 and 917. Side portion 917 can have an end 961 and an end 962 opposite end 961. In one example, housing 810 can be similar to housing 110 (FIG. 1).

Device 800 can include one or more electrical connectors 821 and one or more electrical connectors 831. In the illustrated embodiment, device 800 includes three electrical connectors 831, two electrical connectors 821, and a power port 220. Electrical connectors 821 can be located on top portion 811, and electrical connectors 831 can be located on side portion 813.

In the same or different embodiment, electrical connectors 831 and 821 are universal serial bus ports, and similar to universal serial bus ports 210 (FIG. 2) and 120 (FIG. 1), respectively. The universal serial bus ports can be type-A, type-B, or mini universal serial bus ports in some examples. In a further embodiment, device 800 is an Ethernet hub, and electrical connectors 821 and 831 can be 10BASE-T, 100BASE-T, BNC (Bayonet Neill Concelman), or AUI (Attachment Unit Interface) connectors. In yet another embodiment, device 800 is a memory device, and electrical connectors 821 and 831 can be universal serial bus ports or serial port connectors.

In one embodiment, top portion 811 includes a region 814 and a region 815, where region 814 is higher than region 815. In this embodiment, electrical connectors 821 can be located at region 814. In some examples, regions 814 and 815 are similar to regions 114 and 115 (FIG. 1).

In one embodiment, cable management element 850 can be located at side portion 917, and includes a flexible tube 851 with an opening 852 along the length of flexible tube 851. In one example, flexible tube 851 and opening 852 extend from end 961 to end 962, and opening 852 opens towards top portion 811. Opening 852 can also be substantially planar with region 815. In the same or a different example, flexible tube 851 extends along the entire side portion 917. In other embodiments, flexible tube 851 extends for only a portion of side portion 917. In one embodiment, flexible tube 851 is parallel to top portion 811.

Flexible tube 851 can have a hollow interior 955 coupled to opening 852. Hollow interior 955 can have openings 953 and 854 adjacent to side portions 912 and 813, respectively. In some embodiments, openings 953 and 854 are parallel to side portions 912 and 813, respectively.

In the illustrated example, flexible tube 851 can have the shape of a cylinder. In one example, flexible tube 851 has the shape of a right angle cylinder. In other embodiments, flexible tube 851 is non-cylindrical in shape. In some embodiments, flexible tube 851 can have an irregular shape.

Figure 10:
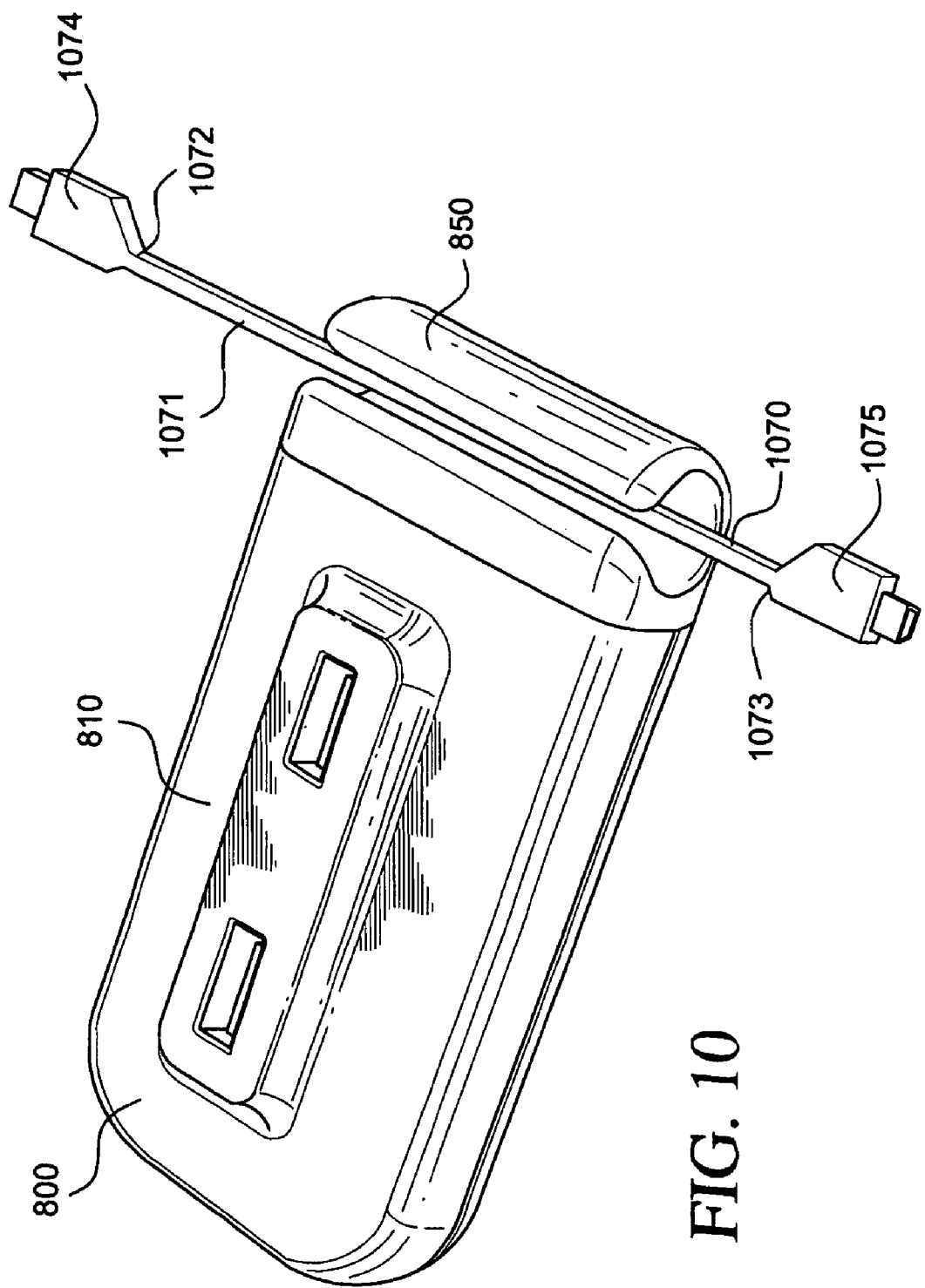
FIG. 10 illustrates an isometric view of the electrical device of FIG. 8 containing a portion of a cable according to an embodiment.

Flexible tube 851 is capable of containing portions of one or more electrical cables. FIG. 10 illustrates an isometric view of device 800 containing a portion of a cable 1070 according to an embodiment. Cable 1070 can include a wire portion 1071 with ends 1072 and 1073, a connector 1074 coupled to wire portion 1071 at end 1072, and a connector 1075 coupled to wire portion 1071 at end 1073. Wire portion 1071 of cable 1070 can be placed inside of hollow interior 955 through opening 852. In some embodiments, placing wire portion 1071 in cable management element 850 helps to manage clutter on the user's desk, and create a more organized workspace. In further embodiments, multiple cables including cable 1070 can be placed inside of hollow interior 955.

In one embodiment, cable 1070 is only coupled to foreign electrical apparatuses or components (not shown) and not to device 800. That is, connector 1074 is coupled to a first foreign electrical component, and connector 1075 is coupled to a second foreign electrical component. The foreign electrical apparatuses or components can be electrical outlets, computers, computer accessories, peripheral devices, portable electrical devices (e.g. cell phones, person digital assistance, dongles, and digital music players), etc. In a further embodiment, connector 1074 or connector 1075 can be coupled to either one of electrical connectors 821 or 831.

In one embodiment, the width of opening 852 is smaller than the diameter of cable 1070. In this embodiment, opening 852 can expand to allow insertion into flexible tube 851 of cable 1070. In one example, flexible tube 851 can bend or bow such that the width of opening 852 increases, and wire portion 1071 of cable 1070 can be inserted into hollow interior 955. After insertion of wire portion 1071, the width of opening 852 can return to its original unstretched width. In one example, the unstretched width of opening 852 can be 2.0 millimeters.

Housing 810 can comprise a rigid plastic. For example, housing 810 can comprise acrylonitrile butadiene styrene (ABS). In other examples, housing 810 can comprise polyethylene, polycarbonate, or polypropylene. In one embodiment, flexible tube 851 can comprise polyethylene or rubber. In other embodiments, any elastomer can be used to form flexible tube 851. Regardless of their composition, housing 810 is more rigid and less flexible than flexible tube 851, and flexible tube 851 is more flexible and less rigid than housing 810.

In one example, flexible tube 851 can be formed of polyethylene, and housing 810 can be composed of a rigid plastic. In this example, the friction on the surface of flexible tube 851 is higher than the friction on the surface of housing 810.

Figure 11:
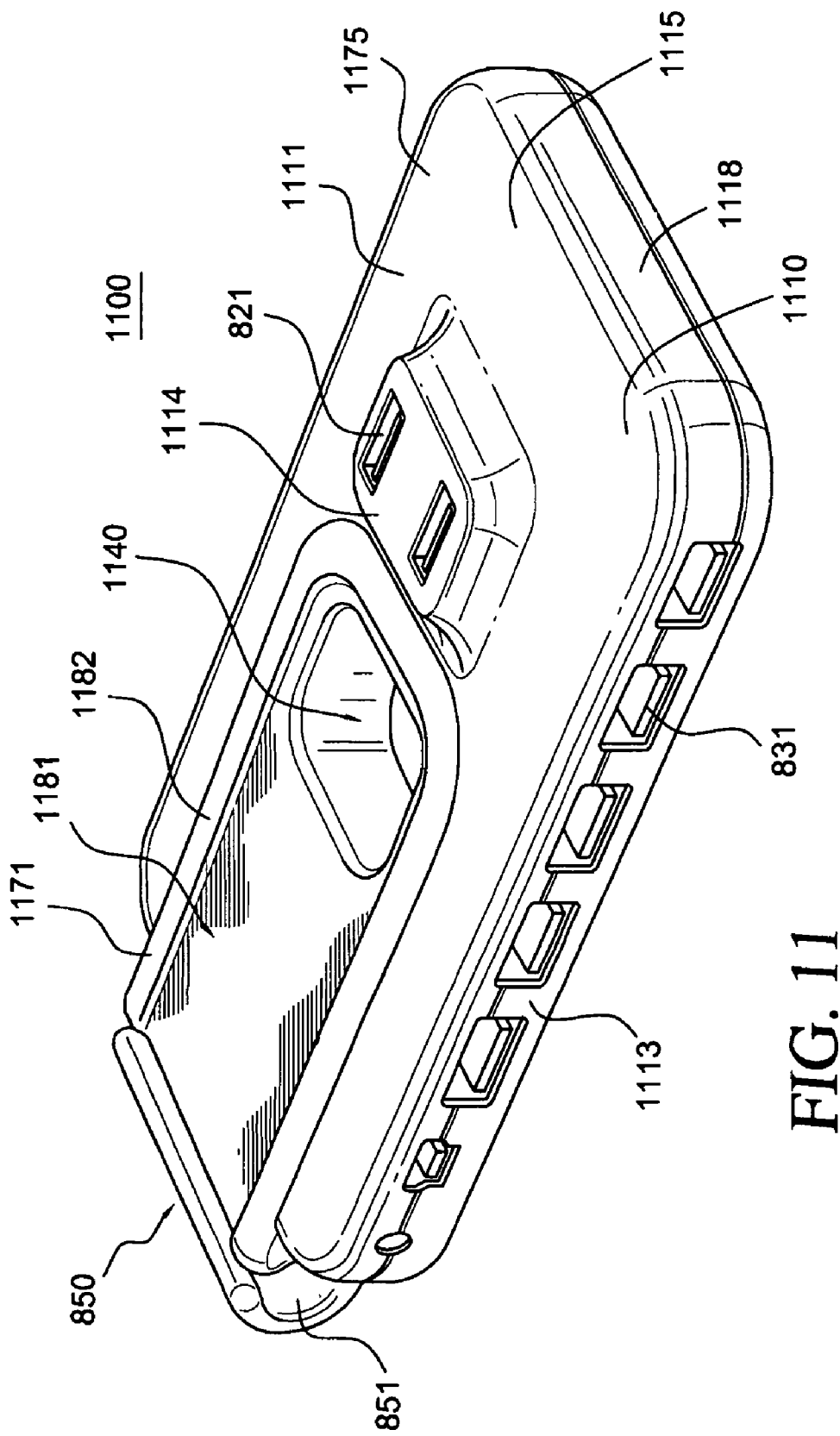
FIG. 11 illustrates an isometric view of an electrical device according to an additional embodiment.
Figure 12:
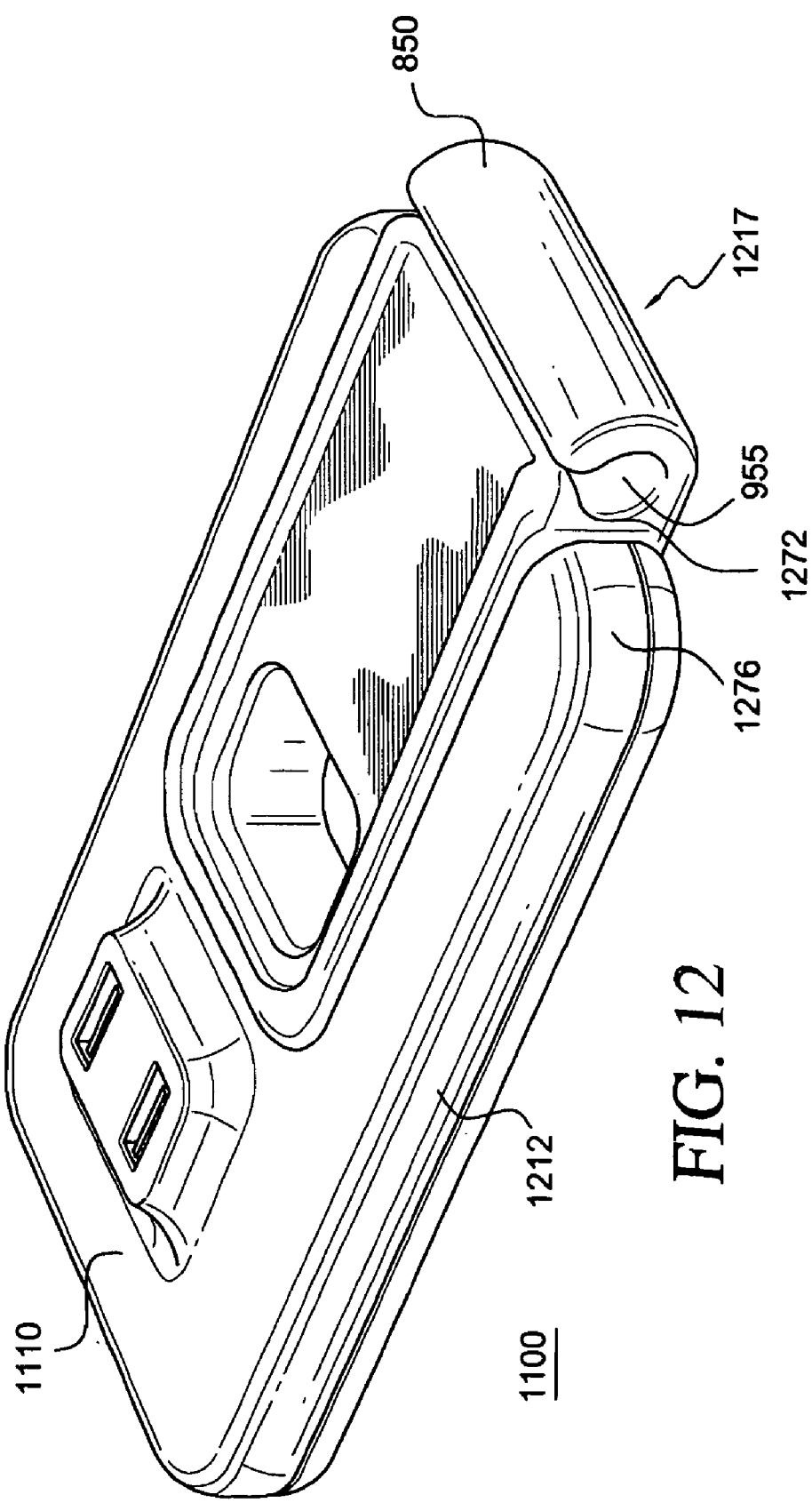
FIG. 12 illustrates a different isometric view of the electrical device of FIG. 11 according to an embodiment.
Figure 13:
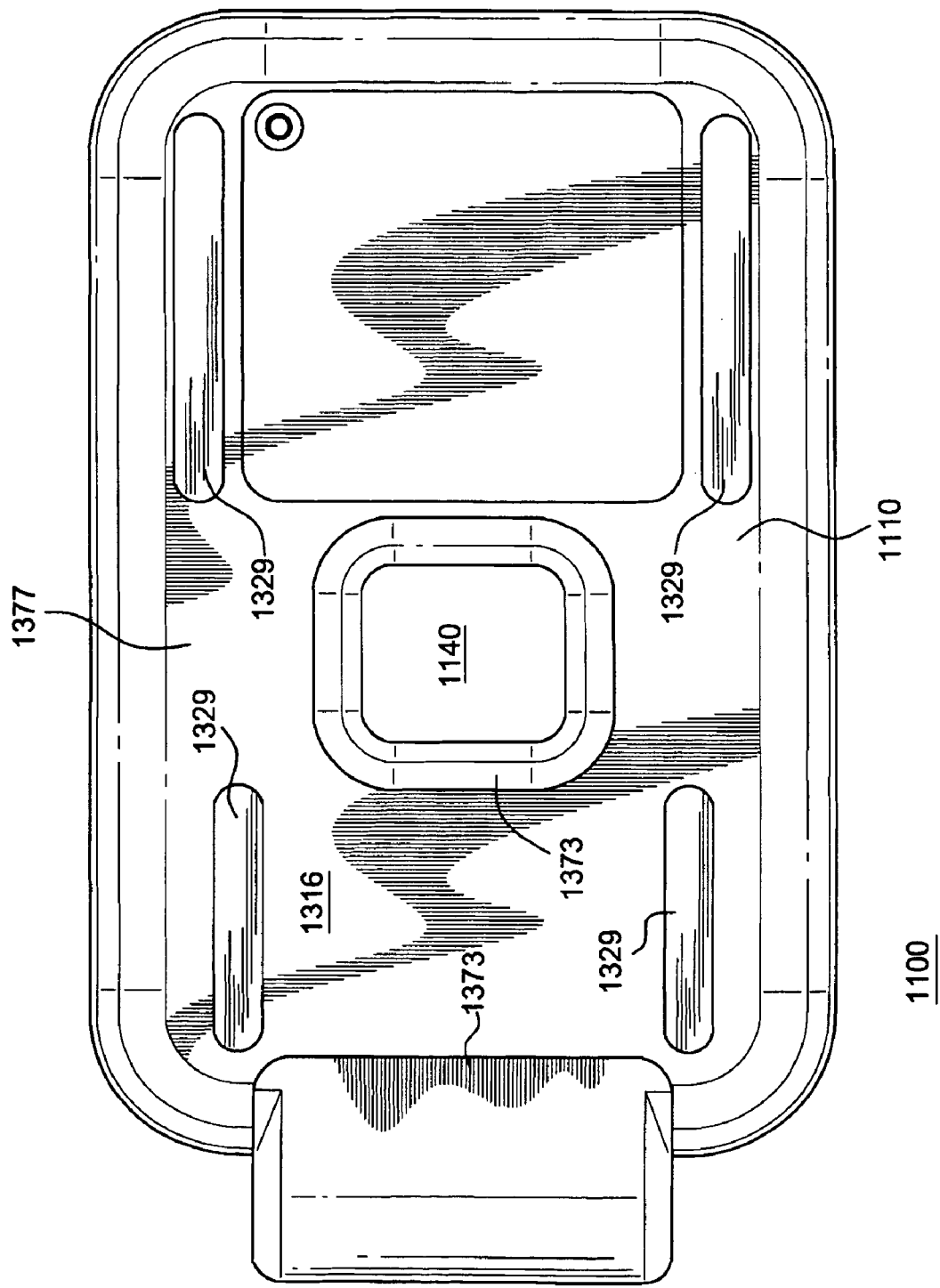
FIG. 13 illustrates a bottom view of the electrical device of FIG. 11 according to an embodiment.
Figure 14:
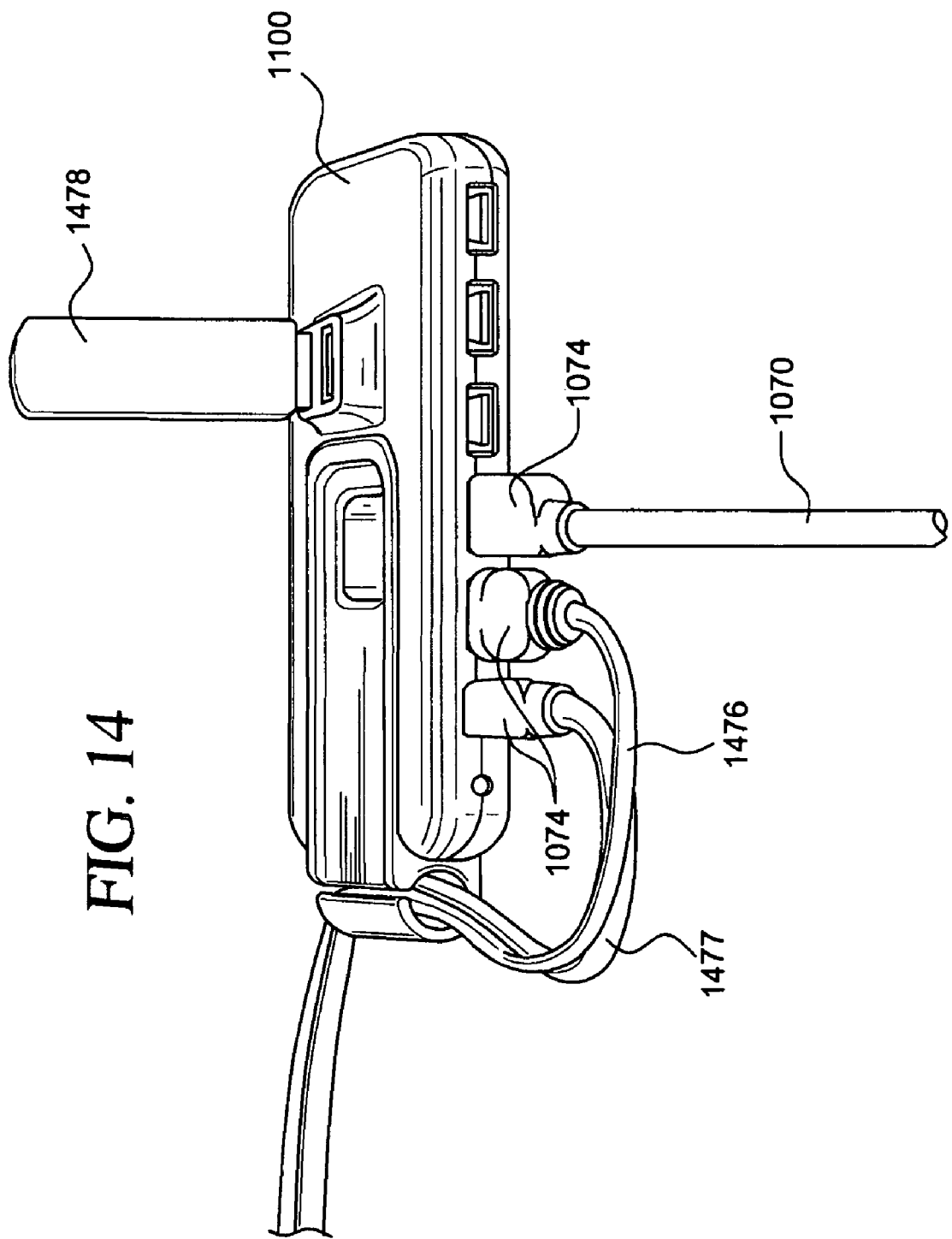
FIG. 14 illustrates an isometric view of the electrical device of FIG. 11 coupled to multiple cables and a peripheral device according to an embodiment.

FIGS. 11 and 12 illustrate isometric views of an electrical device 1100 according to an additional embodiment. FIG. 13 illustrates a bottom view of device 1100 according to an embodiment. FIG. 14 illustrates an isometric view of device 1100 coupled to a peripheral device 1478 and cables 1070, 1476, and 1477 according to an embodiment.

In one embodiment, device 1100 can include a casing or housing 1110, electrical connectors 821 and 831, and cable management element 850. As shown in FIGS. 11-13, housing 1110 can include a top portion 1111, a bottom portion 1316, and side portions 1212, 1113, 1217, and 1118. In the illustrated embodiment, housing 1110 includes a hole 1140 extending from top portion 1111 to bottom portion 1316. Hole 1140 can be similar to hole 140 (FIG. 1). Similar to top portion 111 (FIG. 1) and top portion 811 (FIG. 8), top portion 1111 can include regions 1114 and 1115, where region 1114 is higher than region 1115. Electrical connectors 821 can be located at region 1114.

In the illustrated embodiment, the length of cable management element 850 is less than the length of side portion 1217. In other embodiments, cable management element 850 extends for the entire length of side portion 1217. Furthermore, in some embodiments, housing 1110 can include one or more feet 1329 on bottom portion 1316. Feet 1329 can be identical to or substantially similar to feet 610 (FIG. 6). Feet 1329 can be rubberized or have a high friction surface to inhibit the sliding of device 1100 across the surface supporting device 1100 to help keep the one or more cables within cable management element 850 organized. Device 800 in FIGS. 8-10 can have similar feet.

In one embodiment, a part 1272 of side portion 1217, a part 1373 of bottom portion 1316, a part 1171 of top portion 1111, and flexible tube 851 are formed from a first material. In one example, the first material comprises polyethylene. In the same embodiment, a part 1276 of side portion 1217, a part 1377 of bottom portion 1316, and a part 1175 of top portion 1111 comprise a second material different than the first material. In one example, the second material is a rigid plastic, such as ABS.

Cables 1476 and 1477 (FIG. 14) can be identical to or substantially similar to cable 1070. In the illustrated embodiment, connectors 1074 of cables 1070 and 1476 are type-A universal serial ports and connector 1074 of cables 1477 is a type-B universal serial port. As shown in FIG. 14, electrical connectors 831 can be coupled to connectors 1074 of cables 1070, 1476, and 1477, and one of electrical connectors 821 can be coupled to peripheral device 1478. Wire portion 1071 of each of cables 1070, 1476, and 1477 can be placed inside of hollow interior 955 of cable management element 850. In the illustrated embodiment, only portions of cables 1070 and 1476 are enclosed in hollow interior 955. In other embodiments, peripheral device 1478 can be coupled to one of electrical connectors 831, and cables 1070 and/or 1476 can be coupled to one of electrical connectors 821.

Referring back to FIGS. 11-14, top portion 1111 can include a grooved section 1181. In one example, grooved section 1181 is a portion of first part 1171. Grooved section 1181 can provide an area of top portion 1111 where other electrical devices can be stacked. In one embodiment, grooved section 1181 can extend from substantially the center of top portion 1111 to side portion 1217, and have a width equal to or less than the length of cable management element 850. In some embodiments, grooved section 1181 includes a lip 1182 extending around one or more of the edges of grooved section 1181.

Figure 15:
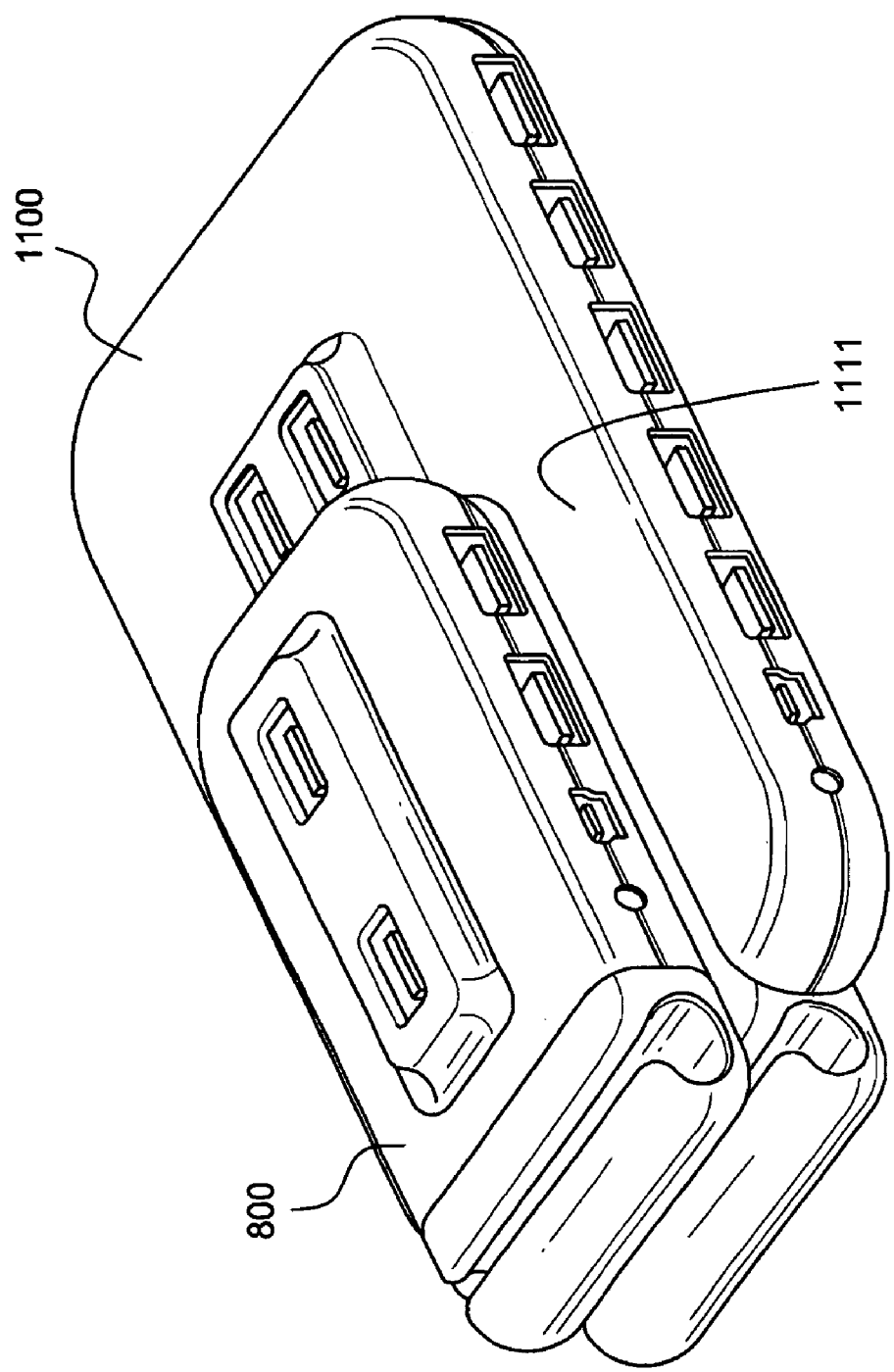
FIG. 15 illustrates an isometric view of the electrical device of FIG. 8 and the electrical device of FIG. 11 in a stacked configuration according to an embodiment.

One example of stacking another electrical device on device 1100 is shown in FIG. 15, which is an isometric view of device 800 stacked on the top of device 1100. Device 800 can be placed on or over grooved section 1181 (FIG. 11). In some embodiments, grooved section 1181 (FIG. 1) includes a material, such as polyethylene, that provides a non-skid, high friction surface to keep device 800 from sliding off top portion 1111. In other examples, other devices such as digital music players or personal digital assistances can be stacked on grooved section 1181 (FIG. 11) or other parts of top portion 1111.

Figure 16:
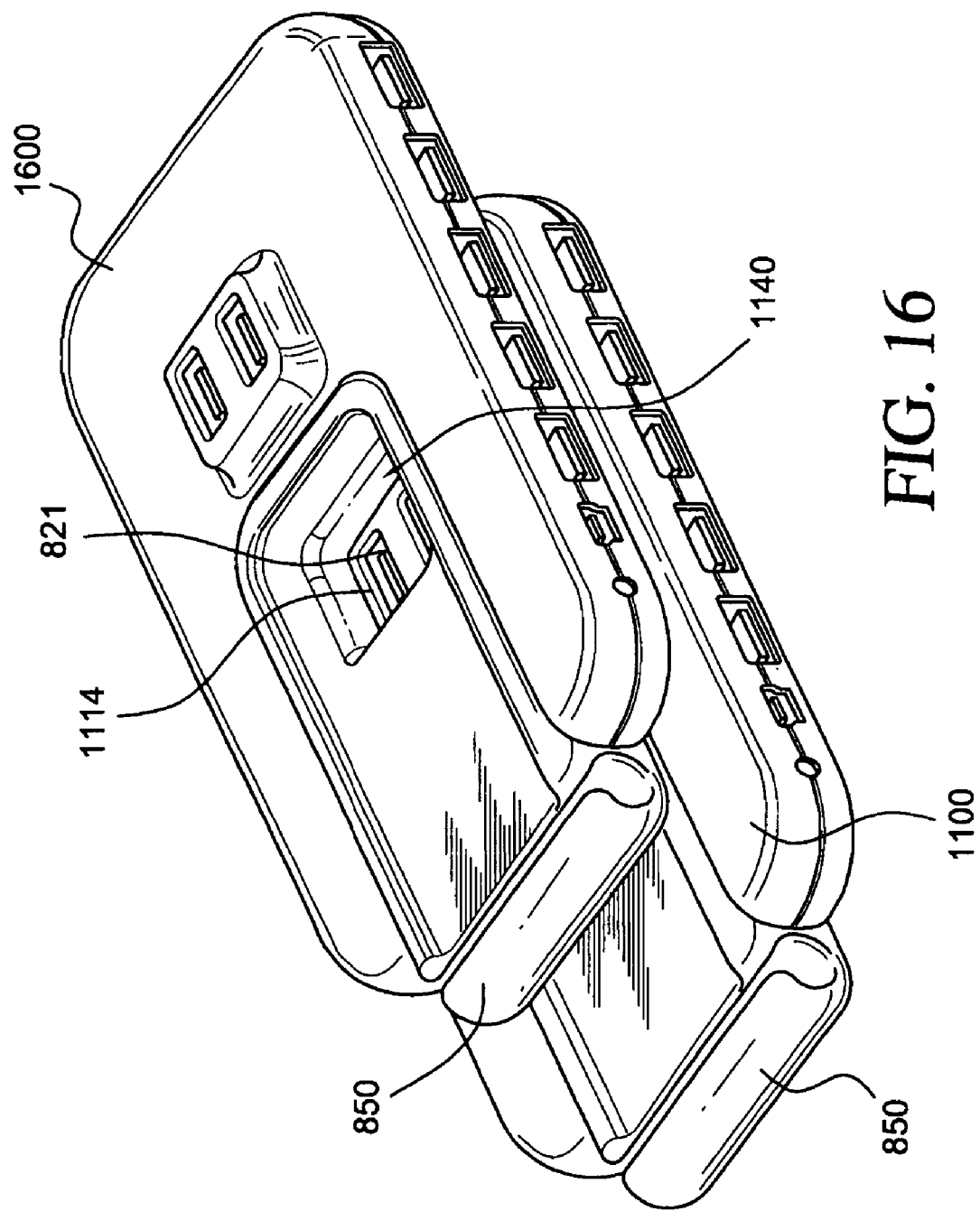
FIG. 16 illustrates an isometric view of two electrical devices of FIG. 11 in a stacked configuration according to an embodiment.

Similar to universal serial bus hub 100 (FIG. 1), device 1100 is also stackable with another electrical device 1600, as illustrated in FIG. 16, which is an isometric view of devices 1100 and 1600 in a stacked position. Device 1600 can be identical or at least substantially similar to device 1100, and each of the reference numbers used herein to identify elements of device 1100 should be understood also to refer to corresponding elements of device 1600. Devices 1100 and 1600 can be stacked similar to devices 100 and 700, as illustrated in FIG. 7.

As shown in FIG. 16, region 1114 of device 1100 extends into hole 1140 of device 1600 when device 1600 is stacked on top of device 1100. As illustrated in FIG. 16, electrical connectors 821 of device 1100 are still accessible when device 1600 is stacked on device 1100.

Device 1600 can be offset in the horizontal plane in relation to device 1100 when devices 1100 and 1600 are stacked. Offsetting device 1600 in the horizontal plane provides a user with easier access to cable management device 850 of device 1100 when device 1600 is stacked over device 1100.

Figure 17:
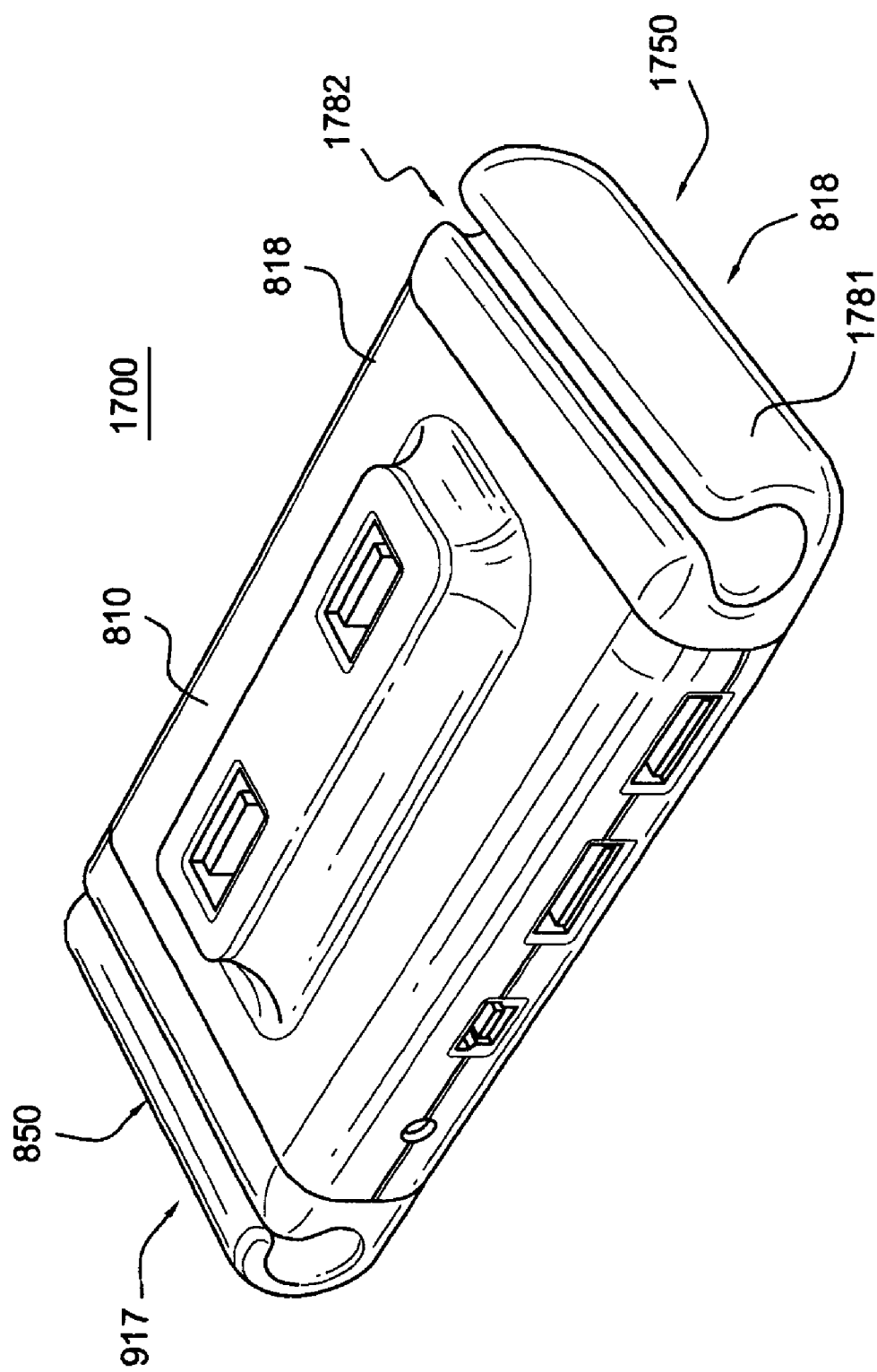
FIG. 17 illustrates an electrical device with two cable management elements according to a further embodiment.

FIG. 17 illustrates an electrical device 1700 with cable management elements 850 and 1750 according to a further embodiment. In some examples, cable management element 1750 is identical to or substantially similar to cable management element 850. In one example, cable management element 1750 includes a flexible tube 1781 with an opening 1782 along the length of flexible tube 1781. Cable management element 1750 can be located at side portion 818 opposite to side portion 917. In other embodiments, cable management element 1750 can be located at side portion 818, and adjacent to side portion 917.

Figure 18:
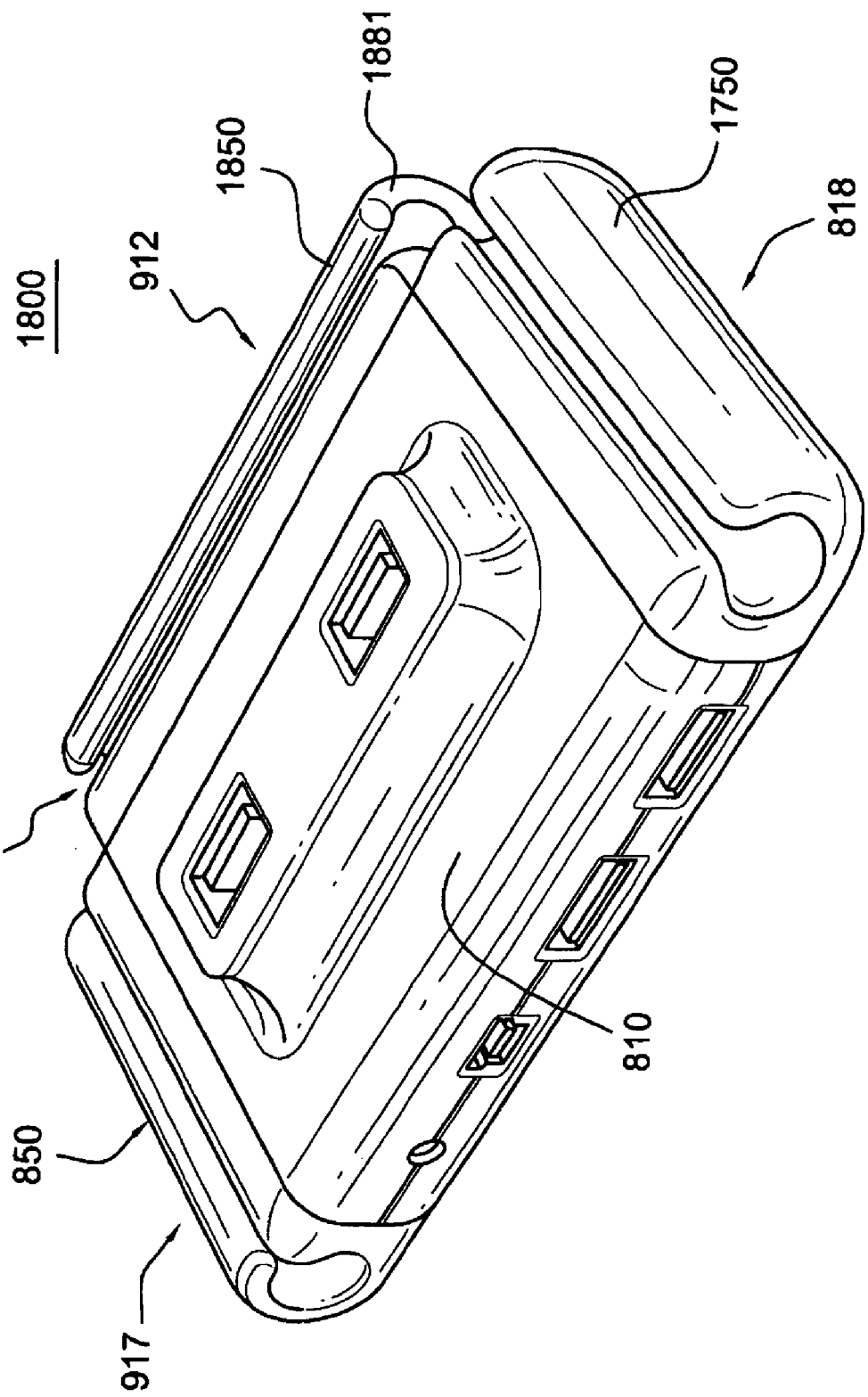
FIG. 18 illustrates an electrical device with three cable management elements according to yet another embodiment.

FIG. 18 illustrates an electrical device 1800 with cable management elements 850, 1750, and 1850, according to an embodiment. In some embodiments, cable management element 1850 can be identical to or substantially similar to cable management elements 850 and 1750. In one example, cable management element 1850 includes a flexible tube 1881 with an opening 1882 along the length of flexible tube 1881. Cable management element 1850 can be located at housing 810. For example, cable management element 1850 can be located at side portion 912.

In a non-illustrated embodiment, an electrical device, similar to device 800 (FIG. 8), can include four or more cable management elements. In some examples, the four or more cable management elements can be identical to or substantially similar to cable management elements 850, 1750, or 1850. In this embodiment, each of cable management elements can be located at housing 810. In yet a further embodiment, device 1100 (FIG. 11) can include two or more cable management elements identical to or substantially similar to cable management elements 850, 1750, or 1850.

Figure 19:
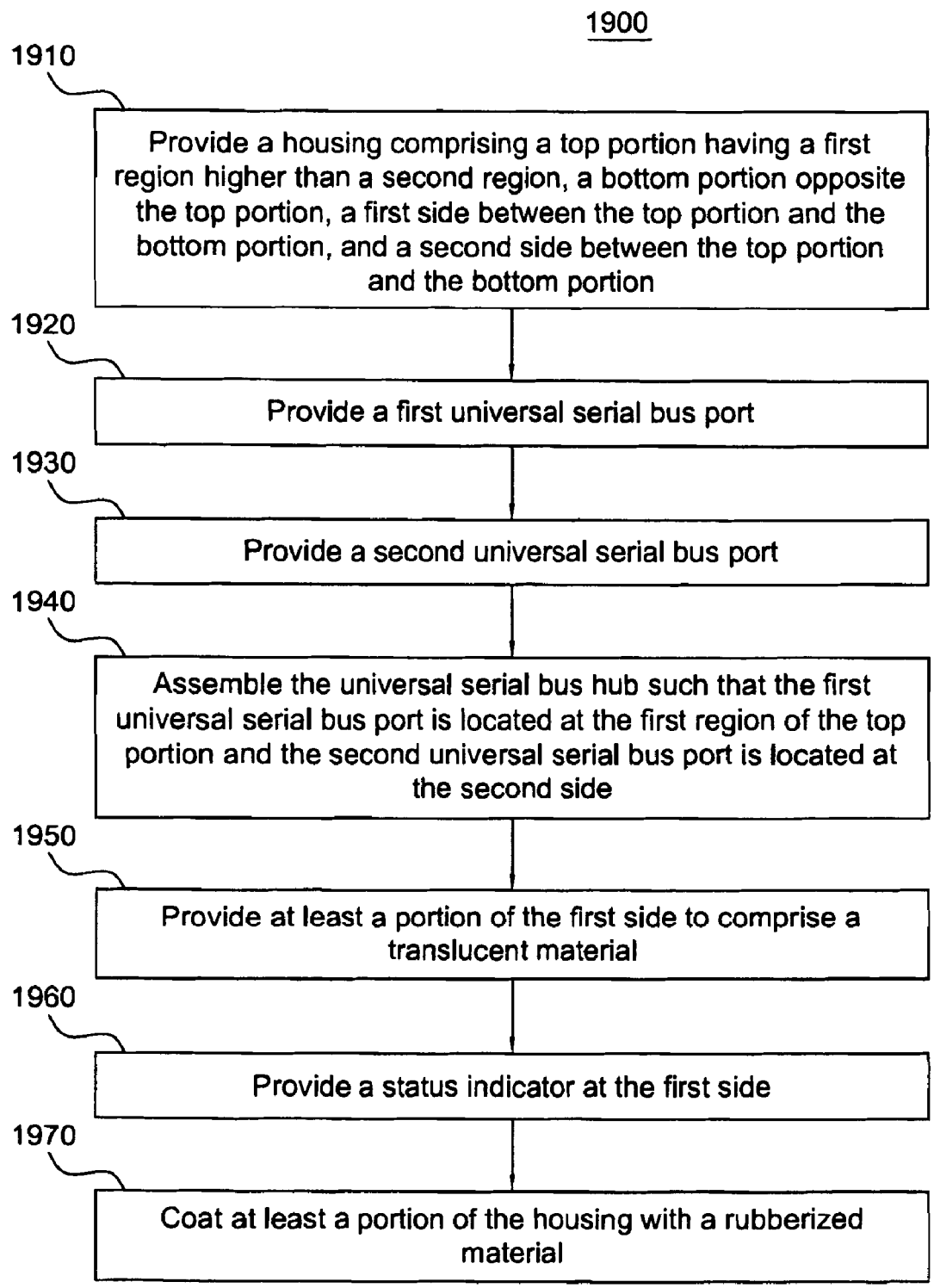
FIG. 19 is a flow chart illustrating a method of manufacturing a universal serial bus hub according to an embodiment.

FIG. 19 is a flow chart illustrating a method 1900 of manufacturing a universal serial bus hub according to an embodiment. A step 1910 of method 1900 is to provide a housing comprising: a top portion having a first region higher than a second region, a bottom portion opposite the top portion, a first side between the top portion and the bottom portion, and a second side between the top portion and the bottom portion. As an example, the housing can be similar to housing 110, first shown in FIG. 1. As another example, the top portion can be similar to top portion 111, first shown in FIG. 1, and the bottom portion can be similar to bottom portion 211, first shown in FIG. 2. As a further example, the first region can be similar to region 114, first shown in FIG. 1, and the second region can be similar to region 115, first shown in FIG. 1. As yet another example, the first side can be similar to side 112, first shown in FIG. 1, and the second side can be similar to side 113, first shown in FIG. 2.

Step 1910 or another step can further comprise providing a hole between the first side and the second side, and extending from the top portion to the bottom portion. As an example, the hole can be similar to hole 140, first shown in FIG. 1.

A step 1920 of method 1900 is to provide a first universal serial bus port. As an example, the first universal serial bus port can be similar to universal serial bus port 120, first shown in FIG. 1.

A step 1930 of method 1900 is to provide a second universal serial bus port. As an example, the second universal serial bus port can be similar to universal serial bus port 210, first shown in FIG. 2.

A step 1940 of method 1900 is to assemble the universal serial bus hub such that the first universal serial bus port is located at the first region of the top portion and the second universal serial bus port is located at the second side.

A step 1950 of method 1900 is to provide at least a portion of the first side to comprise a translucent material. As an example, the portion of the first side can be similar to portion 150, first shown in FIG. 1. In a different embodiment, step 1950 can be performed simultaneously with, or as apart of, step 1910.

A step 1960 of method 1900 is to provide a status indicator at the first side. As an example, the status indicator can be similar to status indicator 710, first shown in FIG. 7. Step 1960 or another step can further comprise one or more of: providing the status indicator to be visible through the portion of the first side; and providing the status indicator to indicate a status of at least one of the first universal serial bus port and the second universal serial bus port. In a different embodiment, the status indicator can be assembled in the universal serial bus hub at step 1940 such that the status indicator is visible through the portion of the first side.

A step 1970 of method 1900 is to coat at least a portion of the housing with a rubberized material. In a different embodiment, step 1970 can be performed simultaneously with, or as a part of, step 1910.

FIG. 20 illustrates a flow chart 2000 for a method of cable management according to an embodiment. Flow chart 2000 includes a step 2010 of providing an electrical device comprising a housing and a first cable management element. The first cable management element can be located at a first side of the housing and can comprise a first flexible tube with a first aperture extending a length of the first flexible tube. As an example, the electrical device of step 2010 can be similar to device 800, 1100, 1700, or 1800, as first shown in FIGS. 8, 11, 17, and 18, respectively. As a further example, the housing of step 2010 can be similar to housing 810 or 1110, as first shown in FIGS. 8 and 11, respectively. As another example, the first side of the housing in step 2010 can be similar to side portion 917, as first shown in FIG. 9. As a further example, the first cable management element of step 2010 can be similar to cable management element 850, as first shown in FIG. 8. As yet another example, the first flexible tube and first aperture of step 2010 can be similar to flexible tube 851 and opening 852, respectively, as first shown in FIG. 8.

Next, flow chart 2000 includes a step 2020 of providing one or more cables. Each of the one or more cables can comprise a wire portion with a first end and a second end, and can also comprise a first connector coupled to the wire portion at the first end and a second connector coupled to the wire portion at the second end. As an example, the one or more cables of step 2020 can be similar to cables 1070, 1476, and 1477, shown in FIGS. 10 and 14. As a further example, the wire portion of step 2020 can be similar to wire portion 1071, as shown in FIGS. 10 and 14, and the first end and the second end of the cables in step 2020 can be similar to ends 1072 and 1073, respectively, as shown in FIG. 10. As yet a further example, the first connector and the second connector of step 2020 can be similar to connectors 1074 and 1075, as illustrated in FIGS. 10 and 14.

Subsequently, flow chart 2000 in FIG. 20 continues with a step 2030 of inserting the wire portions of the one or more cables into the first flexible tube through the first aperture. Examples of the wire portions inserted into the first flexible tube are shown in FIGS. 10 and 14.

Further, flow chart 2000 in FIG. 20 includes an optional step 2040 of coupling the first connectors of the one or more cables to the electrical device or to one or more foreign electrical components. In one example, the one or more foreign electrical components include electrical outlets, computers, computer accessories, peripheral devices, portable electrical devices (e.g., cell phones, person digital assistance, dongles, or digital music players), etc. In one embodiment, step 2040 of coupling the first connectors of the one or more cables can be performed before step 2030 of inserting the wire portions of the one or more cables into the first flexible tube.

In the same or different embodiment, flow chart 2000 can include an additional, but also optional, step 2050 of coupling the second connectors of the one or more cables to one or more second foreign electrical components. The second foreign electrical component can be similar to the first electrical components. Furthermore, step 2050 can be performed before steps 2030 and/or 2040.

Although the invention has been described with reference to specific embodiments, it will be understood by those skilled in the art that various changes may be made without departing from the spirit or scope of the invention. Various examples of such changes have been given in the foregoing description. Additionally, connectors 1074 and/or 1075 in FIG. 10 can be located within another electrical device.

Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the universal serial bus hub or the housings discussed herein may be implemented in a variety of embodiments, and that the foregoing discussion of certain of these embodiments does not necessarily represent a complete description of all possible embodiments. In another example, the housings can be referred to as casings and the portions can be called surfaces. In yet another example, the openings can be identified as apertures, and the flexible tubes can be referred to as pipes.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An electrical device comprising:
   a housing comprising:
      a top portion;
      a bottom portion opposite the top portion;
      a first side portion between the top portion and the bottom portion; and
      a second side portion between the top portion and the bottom portion;
   a first cable management element located at the first side portion, and comprising:
      a first flexible tube with a first opening along a length of the first flexible tube; and
   one or more first electrical connectors located at the second side portion,
   wherein:
      the first opening opens towards the top portion; and
      the first flexible tube has a hollow interior coupled to the first opening and extending the length of the first flexible tube.

2. The electrical device of claim 1, wherein:
   the first flexible tube is capable of containing portions of one or more cables.

3. The electrical device of claim 2, wherein:
   the one or more cables are only coupled to one or more foreign electrical apparatuses and not to the electrical device.

4. The electrical device of claim 2, wherein:
   a width of the first opening is smaller than a diameter of at least one of the one or more cables.

5. The electrical device of claim 4, wherein:
   the first opening expands to allow insertion into the first flexible tube of the at least one of the one or more cables with the diameter larger than the width of the first opening.

6. The electrical device of claim 1, wherein:
   the first flexible tube is cylindrical.

7. The electrical device of claim 1, wherein:
   a part of the housing comprises a rigid plastic;
   the first flexible tube comprises a flexible material; and
   friction on a surface of the flexible material is higher than friction on a surface of the rigid plastic.

8. The electrical device of claim 1, wherein:
   the first flexible tube comprises polyethylene.

9. The electrical device of claim 1, wherein:
   a first part of the first side portion, a first part of the bottom portion, a first part of the top portion, and the first flexible tube comprise a first material.

10. The electrical device of claim 9, wherein:
    a second part of the first side portion, a second part of the bottom portion, and a second part of the top portion comprise a second material different than the first material.

11. The electrical device of claim 10, wherein:
    the first material comprises polyethylene; and
    the second material comprises a rigid plastic.

12. The electrical device of claim 1, wherein:
    the housing comprises a rigid plastic.

13. The electrical device of claim 1, wherein:
    the first side portion has a first end and a second end opposite the first end; and
    the first flexible tube and the first opening of the first flexible tube extend from the first end to the second end.

14. The electrical device of claim 1, further comprising:
    a second cable management element comprising:
       a second flexible tube with a second opening along a length of the second flexible tube.

15. The electrical device of claim 14, wherein:
    the housing further comprises:
       a third side portion between the top portion and the bottom portion; and
    the second cable management element is located at the third side portion.

16. The electrical device of claim 15, wherein:
    the third side portion is adjacent to the first side portion.

17. The electrical device of claim 15, wherein:
    the third side portion is located opposite to the first side portion.

18. The electrical device of claim 14, further comprising:
    one or more third cable management elements, each of the one or more third cable management elements comprising:
       a third flexible tube with a third opening along a length of the third flexible tube.

19. A cable management device comprising:
    a casing comprising:
       a first surface;
       a second surface opposite the first surface;
       a third surface between the first surface and the second surface;
       a fourth surface between the first surface and the second surface; and
       a fifth surface between the first surface and the second surface and between the third surface and the fourth surface;
    a first electrical connector at the first surface;
    a second electrical connector at the fourth surface; and
    a first pipe with a first aperture,
    wherein:
       the first pipe is located at the fifth surface;
       the first aperture opens towards the first surface and extends a length of the first pipe;

the first pipe has a hollow interior coupled to the first aperture and extending the length of the first pipe; and the hollow interior has openings in the first pipe adjacent to the third surface and the fourth surface.

20. The cable management device of claim 19, wherein:
the casing has a hole extending from the first surface to the second surface.

21. The cable management device of claim 19, wherein:
the first pipe comprises a flexible material.

22. The cable management device of claim 19, wherein:
the first aperture is substantially planar with at least a portion of the first surface.

23. The cable management device of claim 19, wherein:
the first electrical connector is a universal serial bus port; and
the second electrical connector is a universal serial bus port.

24. The cable management device of claim 19, wherein:
the first surface has a first section and a second section;
the first section comprises acrylonitrile butadiene styrene; and
the second section and the first pipe comprise polyethylene.

25. The cable management device of claim 19, further comprising:
one or more second pipes located adjacent to the casing, wherein:
each of the one or more second pipes has a second aperture extending a length of each of the one or more pipes.

26. The electrical device of claim 1, wherein:
the length of the first flexible tube is approximately equal to a length of the first side portion.

27. The electrical device of claim 1, wherein:
the housing further comprises:
a third side portion between the top portion and the bottom portion and adjacent to the first side portion;
the first opening is substantially parallel to at least a portion of a surface of the top portion;
the first flexible tube further comprises two or more apertures;
the two or more apertures are coupled to the hollow interior of the first flexible tube;
a first aperture of the two or more apertures is adjacent to the second side portion;
a second aperture of the two or more apertures is adjacent to the third side portion; and
the length of the first flexible tube is approximately equal to a length of the first side portion.

28. An electrical device comprising:
a housing comprising:
a top portion;
a bottom portion opposite the top portion;
a first side portion between the top portion and the bottom portion; and
a second side portion between the top portion and the bottom portion;
a first tube with two or more openings, a first opening of the two or more openings is along a length of the first tube; and
one or more first electrical connectors located at the second side portion,
wherein:
the first tube is located at the first side portion;
the first tube has a hollow interior coupled to the two or more openings, the hollow interior extending the length of the tube; and
at least a part of a second opening of the two or more openings is substantially perpendicular to the first opening of the two or more openings.

29. The electrical device of claim 28, wherein:
the length of the first tube is approximately equal to a length of the first side portion.

30. The electrical device of claim 28, wherein:
a first part of the first side portion, a first part of the bottom portion, a first part of the top portion, and the first tube comprise a first material; and
a second part of the first side portion, a second part of the bottom portion, and a second part of the top portion comprise a second material different than the first material.

31. The electrical device of claim 1, wherein:
the two or more openings comprise a third opening;
at least a part of the third opening is substantially perpendicular to the first opening; and
the second and third openings are coupled directly to the first opening.

* * * * *